US006760547B2

(12) United States Patent
Yoshida

(10) Patent No.: US 6,760,547 B2
(45) Date of Patent: Jul. 6, 2004

(54) RANGEFINDER APPARATUS AND CAMERA EQUIPPED THEREWITH

(75) Inventor: Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/670,799

(22) Filed: Sep. 26, 2003

(65) Prior Publication Data

US 2004/0105673 A1 Jun. 3, 2004

(30) Foreign Application Priority Data

Sep. 27, 2002 (JP) ........................................ 2002-284050

(51) Int. Cl.[7] .............................................. G03B 13/36
(52) U.S. Cl. ........................................ 396/104; 396/128
(58) Field of Search ............................... 396/104, 125, 396/128; 356/3.13–3.16; 250/201.2, 201.6, 201.7, 201.8

(56) References Cited

U.S. PATENT DOCUMENTS

| | | | | |
|---|---|---|---|---|
| 4,561,749 A | * | 12/1985 | Utagawa | 396/101 |
| 5,255,064 A | * | 10/1993 | Maekawa | 356/3.14 |
| 2004/0008983 A1 | * | 1/2004 | Kanemitsu | 396/96 |

FOREIGN PATENT DOCUMENTS

JP          01-179115        7/1989

* cited by examiner

Primary Examiner—W. B. Perkey
(74) Attorney, Agent, or Firm—Leydig, Voit & Mayer, Ltd.

(57) ABSTRACT

A rangefinder apparatus includes an autofocus data generator for forming an image of light from an object at a distance to be determined by rangefinding onto a pair of line sensors. Each line sensor includes light detecting elements, and generates AF data for computing a correlation value according to signals produced by the light detecting elements; an AF data acquirer for acquiring the AF data from a pair of sensor areas used for rangefinding, within the pair of line sensors. A correlation value computer determines a pair of window areas for selecting the AF data to be used for computing the correlation value within the pair of sensor areas, and successively computes correlation values while shifting the pair of window areas; an interpolater for detecting correlation extreme values among the correlation values computed by the correlation value computer, and interpolating the correlation extreme values detected to compute interpolated correlation extreme values. A highest correlation value detector detects, as a highest correlation value, the interpolated correlation extreme value exhibiting the highest correlation among the interpolated correlation extreme values. A shift amount computer computes the shift amount of the window areas yielding the highest correlation value; and an object distance calculator calculates distance to the object according to the shift amount computed.

8 Claims, 26 Drawing Sheets

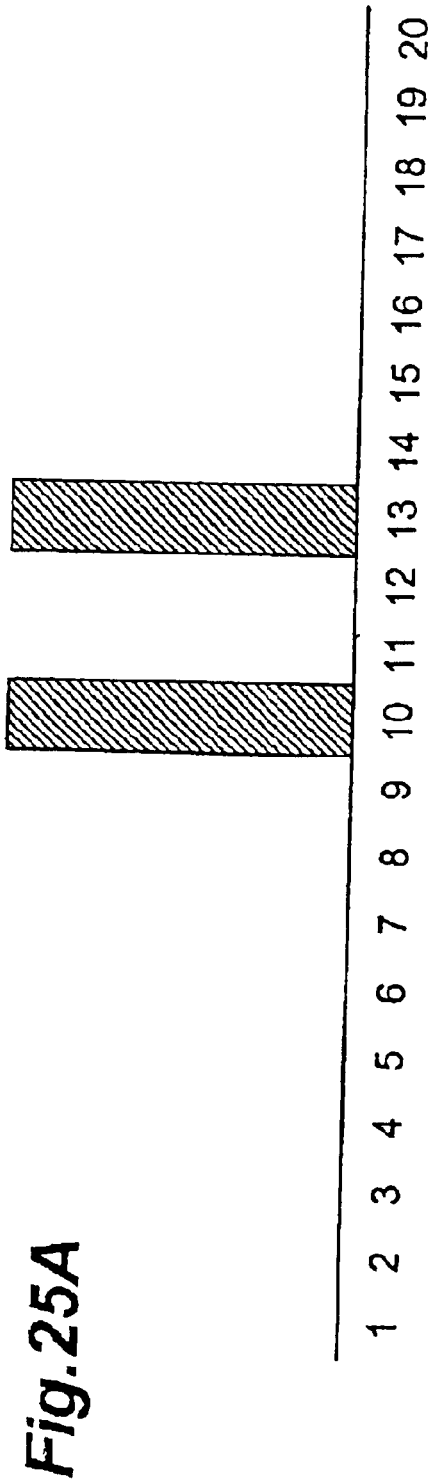
*Fig.25A*
*Fig.25B* SENSOR LEVEL
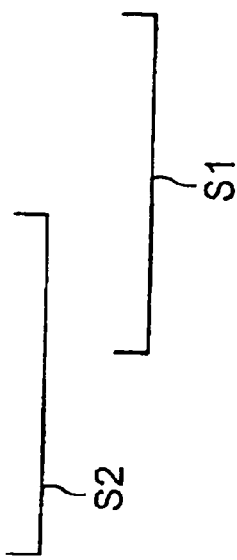

RANGEFINDER APPARATUS AND CAMERA EQUIPPED THEREWITH

BACKGROUND OF THE INVENTION

1. Field of the Invention

The present invention relates to a rangefinder apparatus, more specifically, to a rangefinder apparatus comprising an AF (Auto Focus) sensor of passive type, and a camera equipped with the rangefinder apparatus.

2. Related Background Art

Conventional rangefinder apparatuses determine the reliability of a correlation local minimum value, shift amount of which is used for calculating the distance to the object, in order to avoid erroneous rangefinding.

For example, a rangefinder apparatus disclosed in Japanese Patent No. 2707569 determines the reliability of a local minimum value detected first while changing the shift position of the window areas by checking the difference between gradients, one being the gradient between the correlation local minimum value and a correlation value of the previous shift position, the other being the gradient between the correlation local minimum value and a correlation value of the following shift position. Also, in this rangefinder apparatus, a new correlation local minimum value obtained by interpolation of the respective correlation values of the shift positions before and after the correlation local minimum value is divided by the greater gradient among the above-mentioned gradients, and thus obtained normalized interpolated correlation local minimum value is compared with a reference value so as to determine the reliability of the correlation local minimum value.

SUMMARY OF THE INVENTION

When the above-mentioned two determinations are favorable, the conventional rangefinder apparatus adopts the correlation local minimum value detected first for calculating the distance to the object. Therefore, when a repeating pattern such as the one shown in FIG. 25A is subjected to rangefinding, for example, it chooses the result of a correlation shift region SI shown in FIG. 25B initially subjected to the reliability determination. As shown in FIG. 26, when the difference in correlation value gradients around the correlation local minimum value detected first (the correlation local minimum value on the right side in FIG. 26) and a new interpolated correlation local minimum value obtained by interpolation are favorable, the correlation local minimum value detected first (the correlation local minimum value on the right side in FIG. 26) is adopted for calculating the distance to the object without carrying out shifting to the area yielding the smallest correlation local minimum value (the correlation local minimum value on the left side in FIG. 26), whereby causing rangefinding error.

Thus, when a plurality of correlation local minimum values exist in correlation values, a correlation local minimum value which really is not the smallest correlation local minimum value may be adopted as the smallest correlation local minimum value. When the distance to the object is calculated based on the shift amount of thus erroneously adopted correlation local minimum value, the erroneous rangefinding occurs.

In view of the problem mentioned above, it is an object of the present invention to provide a rangefinder apparatus which can suppress erroneous rangefinding, and a camera equipped with such rangefinder apparatus.

The present invention provides a rangefinder apparatus comprising AF data generating means for forming an image of light from an object to be subjected to rangefinding onto a pair of line sensors each including a plurality of light-receiving elements, and generating AF data for computing a correlation value according to signals obtained from the light-receiving elements, AF data acquiring means for acquiring the AF data from a pair of employed sensor areas used for rangefinding in the pair of line sensors; correlation value computing means for determining a pair of window areas for selecting the AF data to be used for computing the correlation value within the pair of employed sensor areas, and successively computing correlation values while shifting the pair of window areas; interpolated correlation extreme value computing means for detecting a correlation extreme value(s) among the correlation values computed by the correlation value computing means, and interpolating thus detected correlation extreme value(s) so as to compute an interpolated correlation extreme value(s); highest correlation value detecting means for detecting as a highest correlation value the interpolated correlation extreme value exhibiting the highest correlation among the interpolated correlation extreme value(s); shift amount computing means for computing a shift amount of the window areas yielding the highest correlation value; and object distance calculating means for calculating a distance to the object according to the shift amount computed by the shift amount computing means.

This rangefinder apparatus detects a correlation extreme value(s), and interpolates it (them) so as to compute an interpolated correlation extreme value(s). When a plurality of correlation extreme values exist, interpolated correlation extreme values are more reliable for detecting the real smallest correlation extreme value as the highest correlation value. The smallest interpolated correlation extreme value is detected as the highest correlation value, and the shift amount of the highest correlation value is computed. Therefore, as compared with the conventional techniques detecting the highest correlation value from correlation extreme values before interpolation, there is lower possibility to erroneously calculate the distance to the object.

The "AF data" in the present invention include the light intensity data obtained from respective light-receiving elements and the data obtained by processing the light intensity data. Such data processing includes contrast extraction processing that is described in detail hereinafter.

Preferably, the rangefinder apparatus in accordance with the present invention is the one further comprising oscillation degree calculating means for calculating a value indicative of an oscillation degree of the AF data; the interpolated correlation extreme value computing means computing the interpolated correlation is extreme value(s) on the condition that the value indicative of the oscillation degree calculated by the oscillation degree calculating means is greater than a predetermined reference value; and the highest correlation value detecting means detecting the highest correlation value from the correlation extreme value(s) that is not interpolated when the value indicative of the oscillation degree calculated by the oscillation degree calculating means is at or smaller than a predetermined reference value.

Preferably, the rangefinder apparatus in accordance with the present invention is the one further comprising comparing means for detecting a first correlation extreme value exhibiting the highest correlation and a second correlation extreme value exhibiting the second highest correlation in the correlation extreme values that are not interpolated, and judging whether a difference between the first correlation extreme value and the second correlation extreme value normalized by the first correlation extreme value is adequately large by comparing a ratio of the second correlation extreme value to the first correlation extreme value with a predetermined reference value; the interpolated correlation extreme value computing means computing the interpolated correlation extreme value(s) on the condition that the comparing means judges that the difference is not adequately large; and the highest correlation value detecting means detecting the highest correlation value from the correlation extreme value(s) that is not interpolated when the comparing means judges that the difference is adequately large.

By omitting the interpolation computing in case the reliability of the correlation extreme values is verified by the oscillation degree calculating means or the comparing means, overall computation load can be reduced.

Preferably, the rangefinder apparatus in accordance with the present invention is the one further comprising first determining means for determining the validity of the interpolated correlation extreme value(s) computed by the interpolated correlation extreme value computing means; the highest correlation value detecting means detecting the highest correlation value from the correlation extreme value(s) that is not interpolated when the first determining means determines that the interpolated correlation extreme value(s) is invalid.

Preferably, the rangefinder apparatus in accordance with the present invention is the one further comprising second determining means for determining the capability to calculate the distance to the object by comparing the difference between a first interpolated correlation extreme value exhibiting the highest correlation and a second interpolated correlation extreme value exhibiting the second highest correlation in the interpolated correlation extreme values computed by the interpolated correlation extreme value computing means with a predetermined reference value.

By withholding the adoption of unreliable interpolated correlation extreme values by means of the first determining means or the second determining means, the rangefinding becomes more accurate.

Preferably, the rangefinder apparatus in accordance with the present invention is the one wherein the second determining means changes the predetermined reference value according to the first interpolated correlation extreme value. It becomes possible to determine the capability to calculate the distance to the object further in detail by this configuration.

Preferably, the rangefinder apparatus in accordance with the present invention is the one wherein the shift amount of the window areas yielding the highest correlation value based on the interpolated correlation extreme value(s) is computed using an arithmetic expression that is used in computing the interpolated correlation extreme value(s). Accurate shift amount can be obtained by this configuration.

The present invention provides a camera comprising any of the rangefinder apparatus mentioned above. The camera is not only still cameras such as film cameras and digital still cameras, but also video cameras.

BRIEF DESCRIPTION OF THE DRAWINGS

FIGS. 25A and 25B are diagrams for explaining a rangefinding technique in a conventional rangefinder apparatus.

DESCRIPTION OF THE PREFERRED EMBODIMENTS

In the following, embodiments of the present invention will be explained with reference to the accompanying drawings. In the explanation of the drawings, constituents identical to each other will be referred to with numerals identical to each other without repeating their overlapping explanations.

Figure 1:
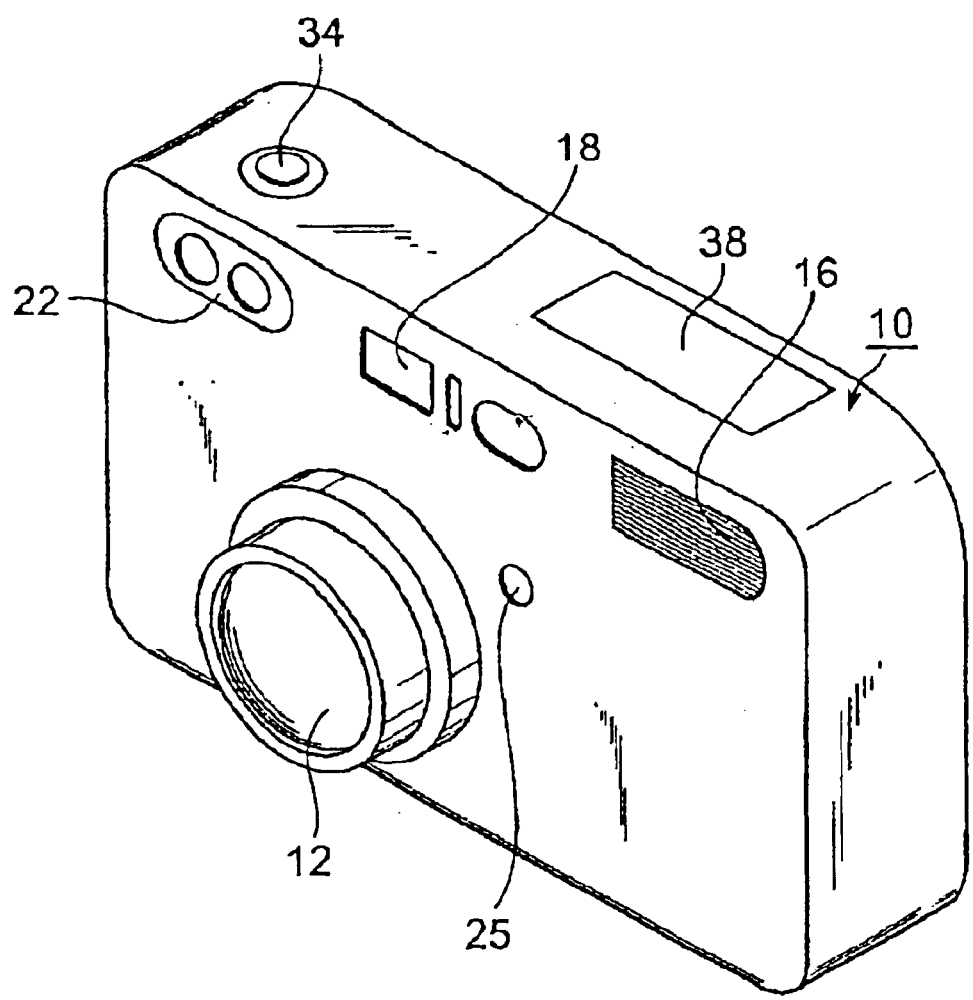
FIG. 1 is a perspective view showing the configuration on the front side of a camera equipped with the rangefinder apparatus in accordance with an embodiment of the present invention.

FIG. 1 is a perspective view showing the configuration on the front side of a camera equipped with the rangefinder apparatus in accordance with an embodiment of the present invention. As shown in FIG. 1, this camera 10 is provided with a zoom lens barrel 12 including a taking lens for forming an object image onto a silver halide film, a flash window 16 for flashing, a finder window 18 for a photographer to see the object, an AF window 22 incorporating therein an AF sensor of passive type for measuring the distance to the object, a photometric window 25 incorporating therein a photometric sensor for measuring the brightness of the object, a shutter button 34 to be operated by the photographer when ordering a shutter release, and the like.

Figure 2:
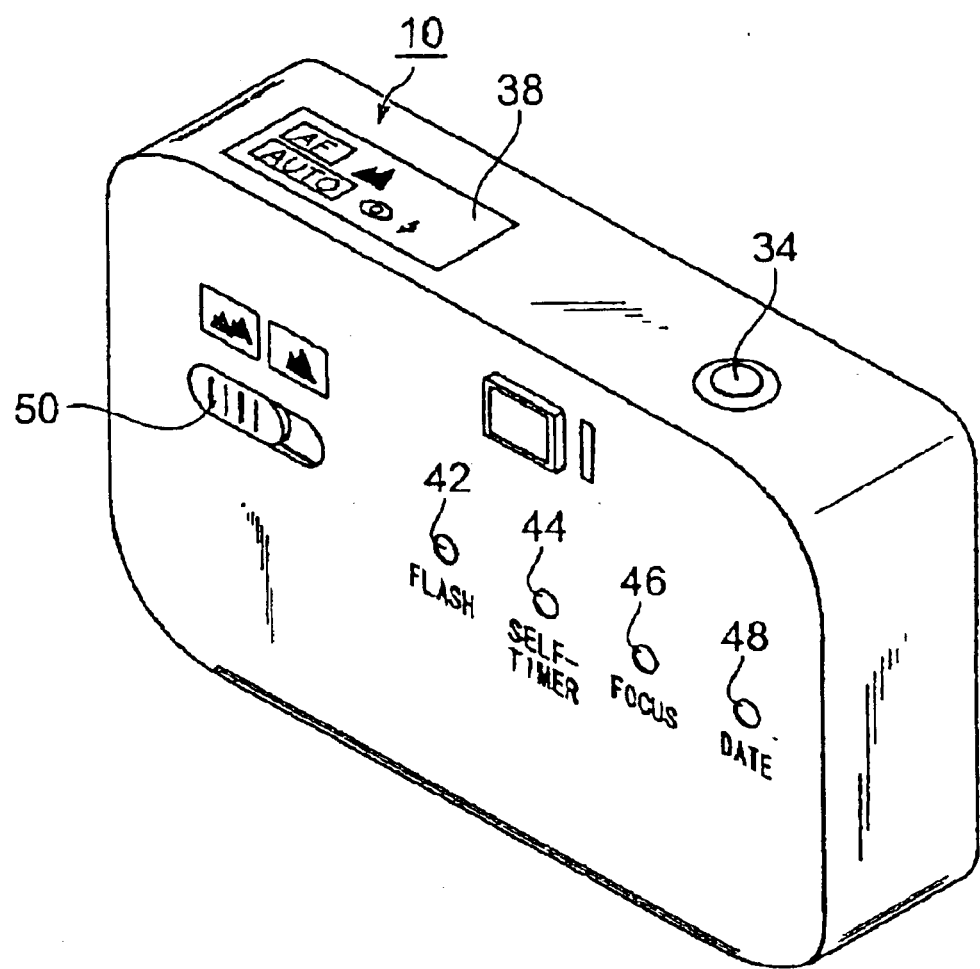
FIG. 2 is a perspective view showing the configuration on the back side of a camera equipped with the rangefinder apparatus in accordance with the embodiment.

FIG. 2 is a perspective view showing the configuration on the back side of the camera 10. As shown in FIG. 2, the camera 10 is provided with an LCD panel 38 for displaying a taking mode which is set, date information, and the like; a flash button 42 for setting a flashing mode of the flash; a self-timer button 44 for setting a mode of a self-timer; a focus button 46 for setting a focus mode; a date button 48 for setting date and time; and a zoom button 50 for selecting the taking angle of view between wide and tele directions.

Figure 3:
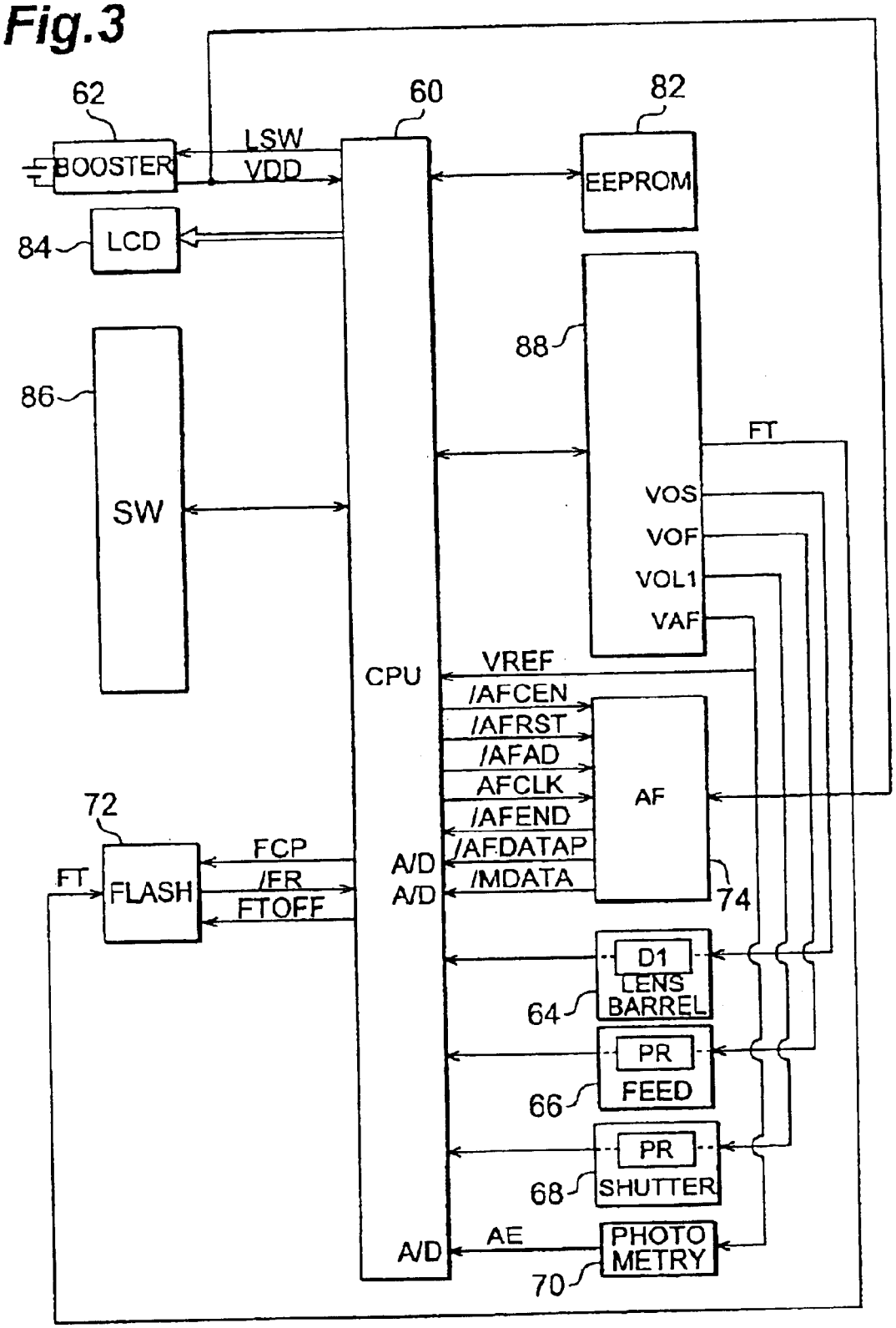
FIG. 3 is a block diagram showing the control unit of the camera in accordance with the embodiment.

FIG. 3 is a block diagram showing a control unit of the camera 10. As shown in FIG. 3, the camera 10 is equipped with a CPU 60 (information processing means) for controlling the whole camera 10, and can acquire information from each of the parts set forth in the following and control each of them according to instructions from the CPU 60. The CPU 60 shown in FIG. 3 may be an ASIC constituted by a CPU core part and peripheral circuits such as I/O, watchdog timer, and AID converter.

Also, as shown in FIG. 3, the camera 10 is equipped with a regulator 62 for boosting and stabilizing the voltage of a battery, so as to supply power to the CPU 60 and the peripheral circuits; a lens barrel driving part 64 for driving the zoom lens barrel 12 with a motor, so as to change zoom and focus positions, and inputting positional information of zoom and focus positions to the CPU 60; and a film feeder driving part 66 for feeding a film by driving a film feeding motor.

The camera 10 is also provided with a shutter driving part 68 for opening and closing a shutter upon exposure to light; a photometric sensor 70 for measuring the quantity of light of the object according to the external light taken by way of the photometric window 25 of FIG. 1; a flash apparatus 72 for charging a main capacitor and causing the flash to emit light with light-emitting energy stored in the main capacitor; and an AF sensor 74 of passive type for acquiring data necessary for range finding in autofocus from the object light taken from the AF window 22 of FIG. 1.

The camera 10 is also provided with a programmable ROM 82 (recording means such as EEPROM) for rewritably recording various kinds of information such as parameters and data concerning the control of camera 10, programs for processing, information concerning rangefinding, and the like; and an LCD driving part 84 for outputting signals for displaying graphics, letters, numbers, and the like corresponding to individual modes to the LCD panel 38 according to instructions from the CPU 60.

Operations of various buttons such as the shutter button 34, flash button 42, self-timer button 44, focus button 46, date button 48, and zoom button 50 shown in FIG. 2 are supplied to the CPU 60 as ON/OFF signals from switches provided so as to correspond to the individual buttons. These switches are illustrated as a switch part 86 in FIG. 3. For the shutter button 34, a half-pushed state and a full-pushed state are detected distinctively from each other.

According to instructions from the CPU 60, the driver 88 shown in FIG. 3 can control zoom and focus driving motors provided with the lens barrel driving part 64, and drive the film feeding motor provided with the film feeder driving part 66. Also, the driver 88 can output a reference voltage and driving power to the A/D converter circuit and photometric sensor 70 according to instructions from the CPU 60. Further, according to instructions from the CPU 60, the driver 88 can output to the shutter driving part 68 a control signal for the shutter to open and close at the time when the film is exposed to light, and output to the flash apparatus 72 a signal for lighting/stopping the flash.

Figure 4:
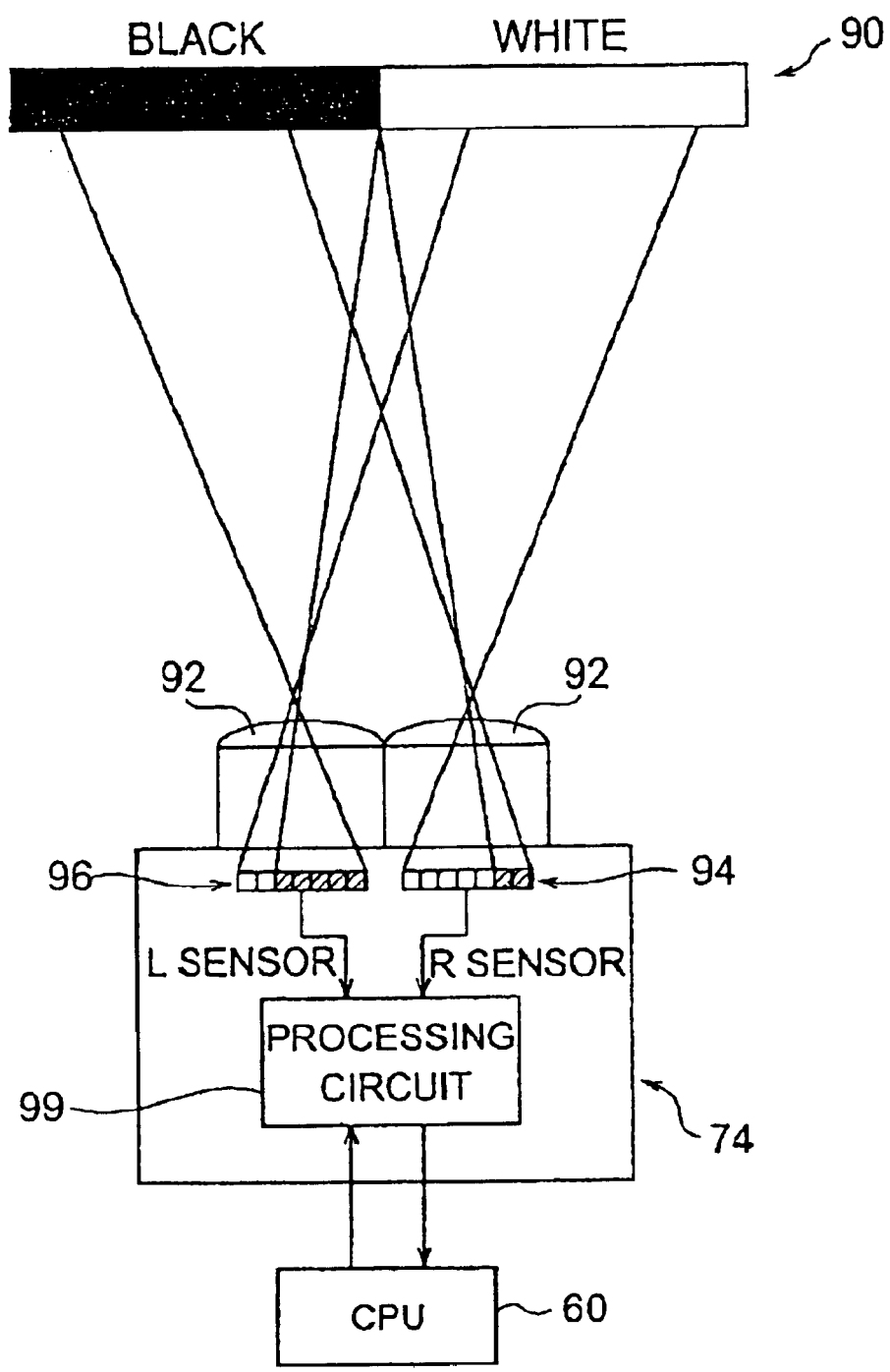
FIG. 4 is a view showing the configuration of an AF sensor of passive type.

FIG. 4 is a view showing the configuration of the AF sensor 74 of passive type. As shown in FIG. 4, the AF sensor 74 is provided with a lens 92 for forming an image of an object 90 constituted by two colors of white and black, for example, onto a light-receiving surface of each of right and left sensors; an R (right) sensor 94 on the right side and an L (left) sensor 96 on the left side, each photoelectrically converting the image formed on the light-receiving surface into a luminance signal and outputting thus obtained signal; and a processing circuit 99 for exchanging various kinds of data with the CPU 60, controlling the R sensor 94 and L sensor 96, and carrying out data processing. The R sensor 94, L sensor 96, and processing circuit 99 are implemented on the same substrate.

Each of the R sensor 94 and L sensor 96 is a CMOS line sensor and is constituted by a plurality of cells (light-receiving elements) arranged on a line. Individual cells in each of the R sensor 94 and L sensor 96 are referred to with sensor numbers 1, 2, 3, . . . , 233, and 234 successively from the left side of the drawing. However, 5 cells each from the left and right ends are unused as dummy cells in practice, whereby the effective sensor region ranges from the sensor numbers 6 to 229. The individual cells of the R sensor 94 and L sensor 96 successively output to the processing circuit 99 luminance signals corresponding to their received light quantities in association with their sensor numbers.

The processing circuit 99 switches between operating and non-operating states of the AF sensor 74 according to instruction signals from the CPU 60. Upon receiving control data from the CPU 60 concerning details of an operation in the operating state, it starts processing such as integration processing according to the control data. The integration processing is an operation for integrating (adding) the respective luminous signals of cells obtained from each cell of the R sensor 94 and L sensor 96, so as to generate an integrated value of luminance signal, which represents integrated value of light quantity, for each cell.

The processing circuit 99 generates sensor data indicative of intensity of light received by each light-receiving cell. The sensor data mean a group of the integrated values of luminance signals without being substantially processed, or a group of values each determined by subtracting the integrated value of luminance signal from a predetermined reference value (reference voltage VREF). In the latter case, which is taken in the following explanation, the sensor data shows a lower value as the received light has a larger quantity. However, processing of the integrated value of luminance signal is not limited to the above-mentioned method. In the following explanation, "integration" or "integration processing" refers to integration processing for obtaining the sensor data.

For example, when the sensor data of any cell within a peak selecting area, which will be explained later, designated by the CPU 60 within the respective sensor areas (effective cells) of the R sensor 94 and L sensor 96, reaches a predetermined integration terminating value, i.e., when the peak value of sensor data (minimum value) within the peak selecting area reaches the integration terminating value, it is determined that sensor data sufficient for rangefinding is obtained, whereby the integration processing is terminated. At this time, the processing circuit 99 outputs a signal (integration terminating signal) indicative of the termination of integration to the CPU 60. Here, instead of taking the case where the peak value of sensor data reaches the integration terminating value as the integration terminating condition as mentioned above, the case where the average value of sensor data within the peak selecting area reaches a predetermined value, for example, or other conditions may also be used as the integration terminating condition.

In response to the integration terminating signal, the CPU 60 acquires sensor data of individual cells obtained by the integration processing from the processing circuit 99 in association with their sensor numbers. As a consequence, the CPU 60 recognizes the images (hereinafter referred to as sensor images) captured by the R sensor 94 and L sensor 96. Then, as will be explained later in detail, correlation value computing is carried out between the respective sensor images of the R sensor 94 and L sensor 96 (or after subjecting sensor images to contrast extraction processing), an amount of deviation of sensor images yielding the highest correlation is determined, and the distance to the object 90 is calculated (the principle of trigonometric measurement).

Figure 5:
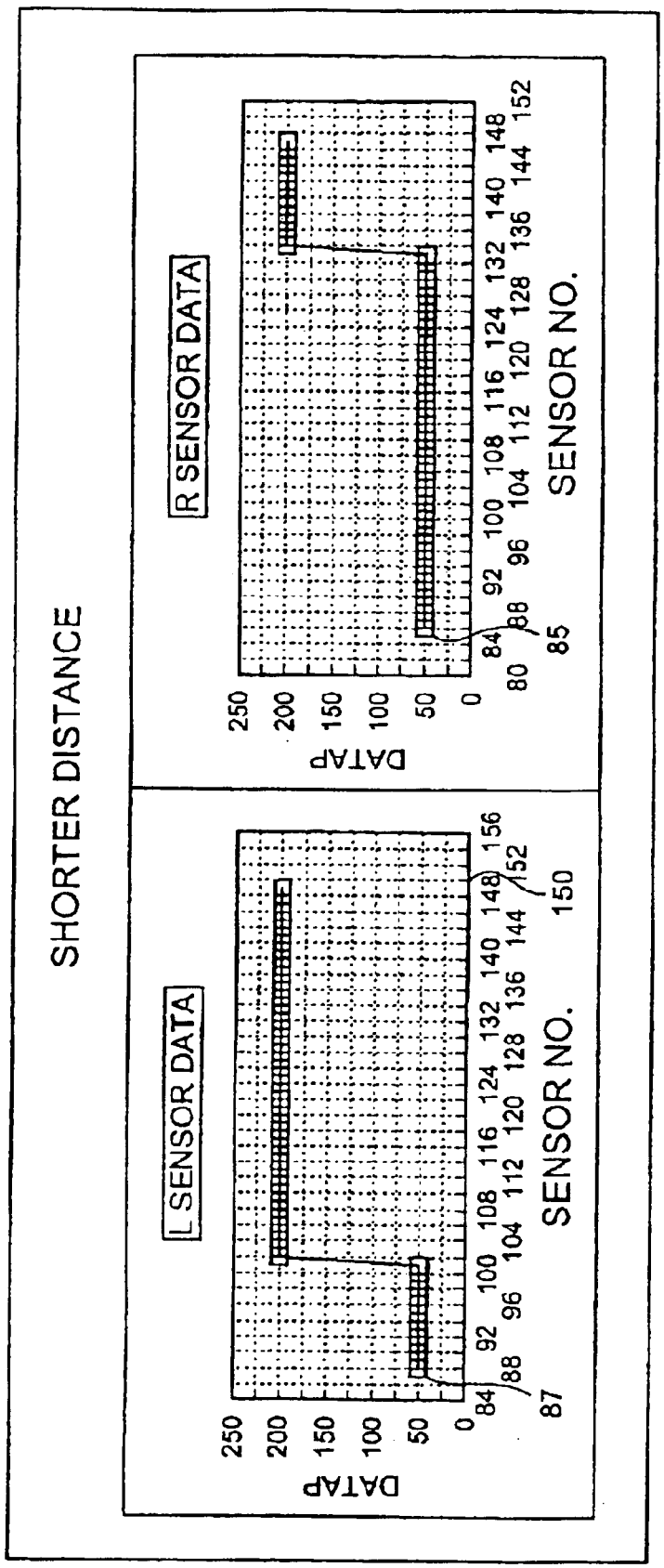
FIG. 5 is a chart illustrating sensor images (AF data) in the case where the distance from the AF sensor to the object is shorter.
Figure 6:
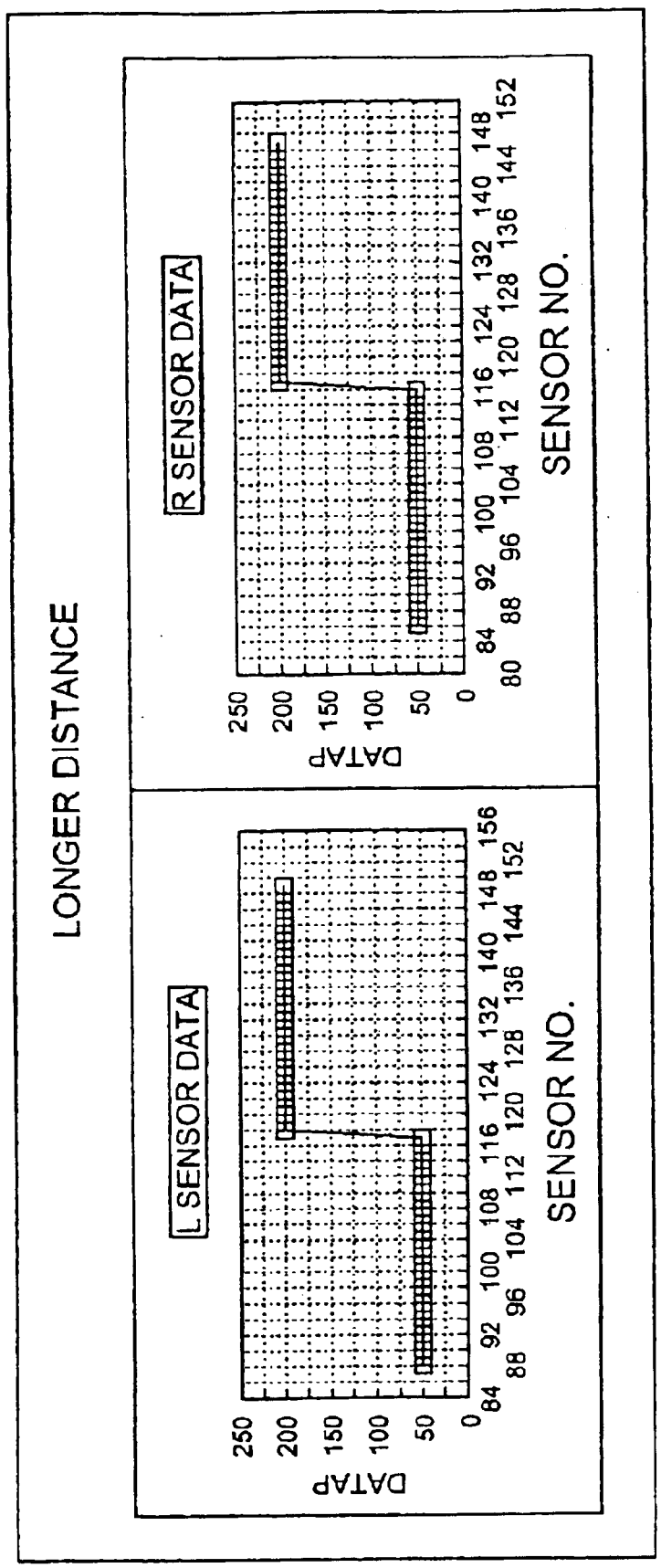
FIG. 6 is a chart illustrating sensor images (AF data) in the case where the distance from the AF sensor to the object is longer.

FIGS. 5 and 6 are charts illustrating sensor images (sensor data) in cases where the distance from the AF sensor 74 to the object 90 is shorter and longer, respectively. When the distance to the object 90 is shorter, as shown in FIG. 5, the sensor data of sensor numbers 87 to 101 in the L sensor 96 attain a brighter value (50), whereas those of sensor numbers 101 to 150 yield a darker value (200). Since the R sensor 94 is disposed at a position different from that of the L sensor 96, sensor data of its sensor numbers 85 to 133 attain a higher value (50), whereas those of its sensor numbers 118 to 150 yield a darker value (200).

When the distance to the object 90 is longer (e.g., at infinity), as shown in FIG. 6, sensor data of sensor numbers 87 to 117 in the L sensor 96 attain a brighter value (50), whereas those of sensor numbers 118 to 150 yield a darker value (200). Though the R sensor 94 is provided at a position different from that of the L sensor 96, because the object position is located at a longer distance, sensor data of sensor numbers 85 to 116 attain a brighter value (50), whereas those of sensor numbers 117 to 148 yield a darker value (200). In this case, the CPU 60 determines that there is substantially no amount of deviation between the respective sensor images of R sensor 94 and L sensor 96, and that the object is located nearly at infinity. By contrast, the amount of deviation in sensor images becomes greater when the object is located at a shorter distance as shown in FIG. 5.

Quantitatively, taking account of the gap between the R sensor 94 and L sensor 96, the distance from each sensor to the lens 92, the pitch (e.g., 12 $\mu$m) of each cell in the R sensor 94 and L sensor 96, and the like, the object distance can be calculated from the amount of deviation of sensor images. The amount of deviation of sensor images can be determined by carrying out correlation value computing between the respective sensor images of the R sensor 94 and L sensor 96.

Figure 7:
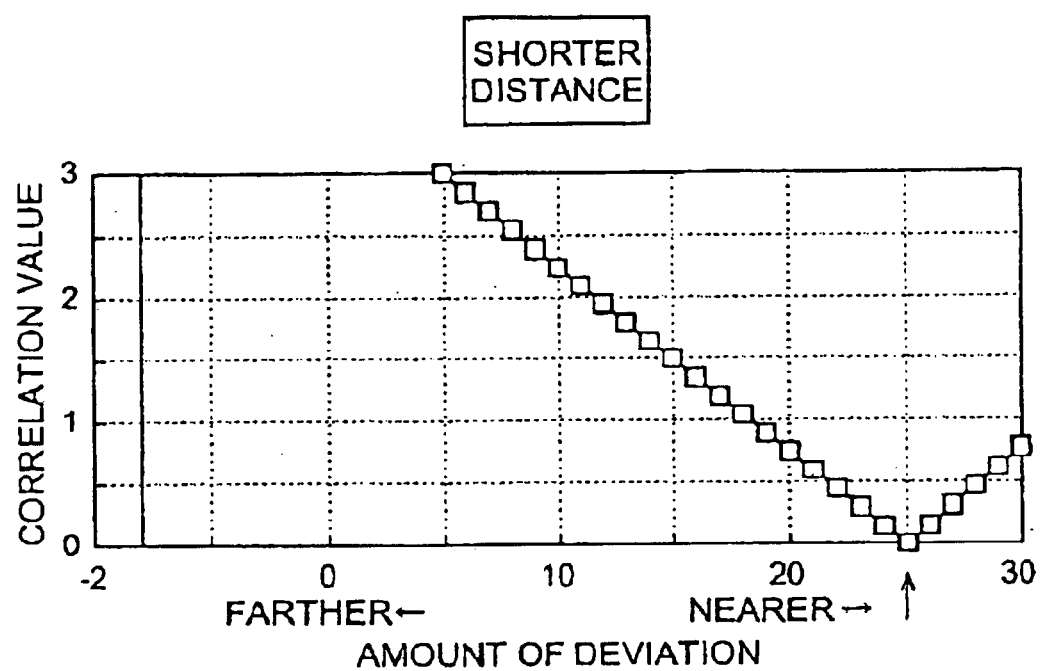
FIG. 7 is a graph showing results of computing of correlation values in the case of FIG. 5.
Figure 8:
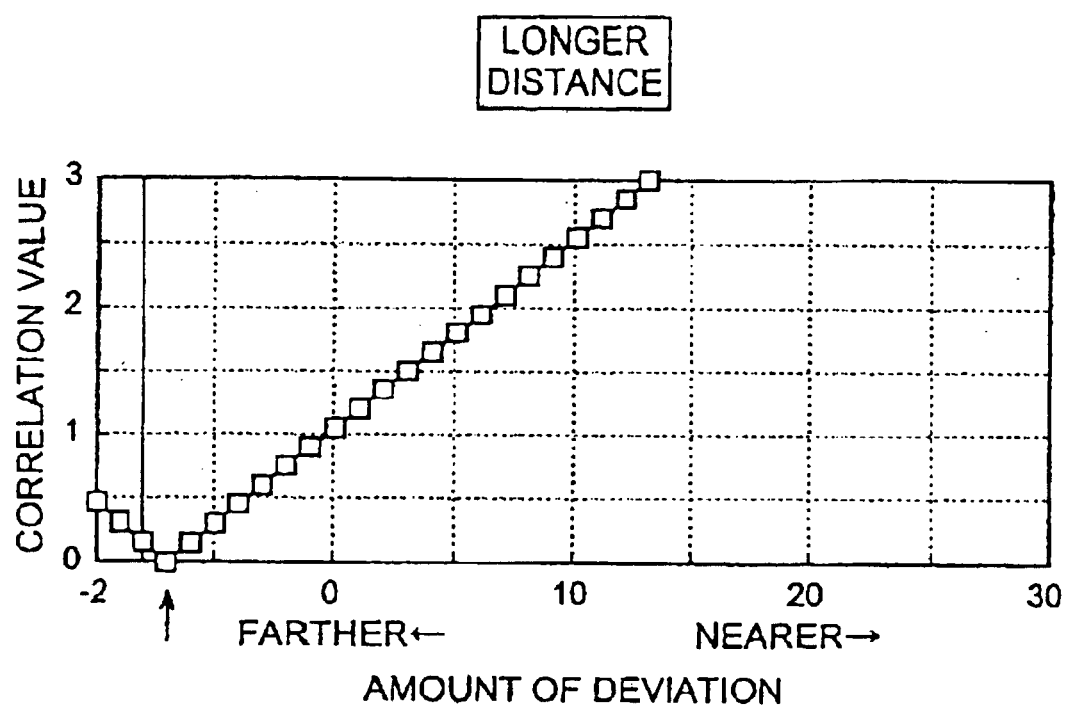
FIG. 8 is a graph showing results of computing of correlation values in the case of FIG. 6.

FIGS. 7 and 8 are graphs showing results of correlation values computed according to the sensor data (AF data) shown in FIGS. 5 and 6. The object distance can be calculated according to the amount of deviation obtained when the correlation value attains the smallest local minimum value. The amount of deviation becomes greater when the object is located at a shorter distance as shown in FIG. 7. On the other hand, the amount of deviation becomes smaller when the object is located at a longer distance as shown in FIG. 8. Details of correlation value computing will be explained later.

Details of AF rangefinding for measuring the distance to the object by using the AF sensor 74 configured as mentioned above, and focusing onto the object will now be explained.

When a user pushes the shutter button halfway while setting the processing mode of the camera to the taking mode, the CPU 60 acquires from the switch part 86 a signal indicative of the fact that the shutter button 34 is half-pushed. Upon acquiring this signal, the CPU 60 sets an AE level corresponding to the luminance of the object in order to take an image of the object, and starts an AF rangefinding process for specifying the object and focusing thereon.

Figure 9:
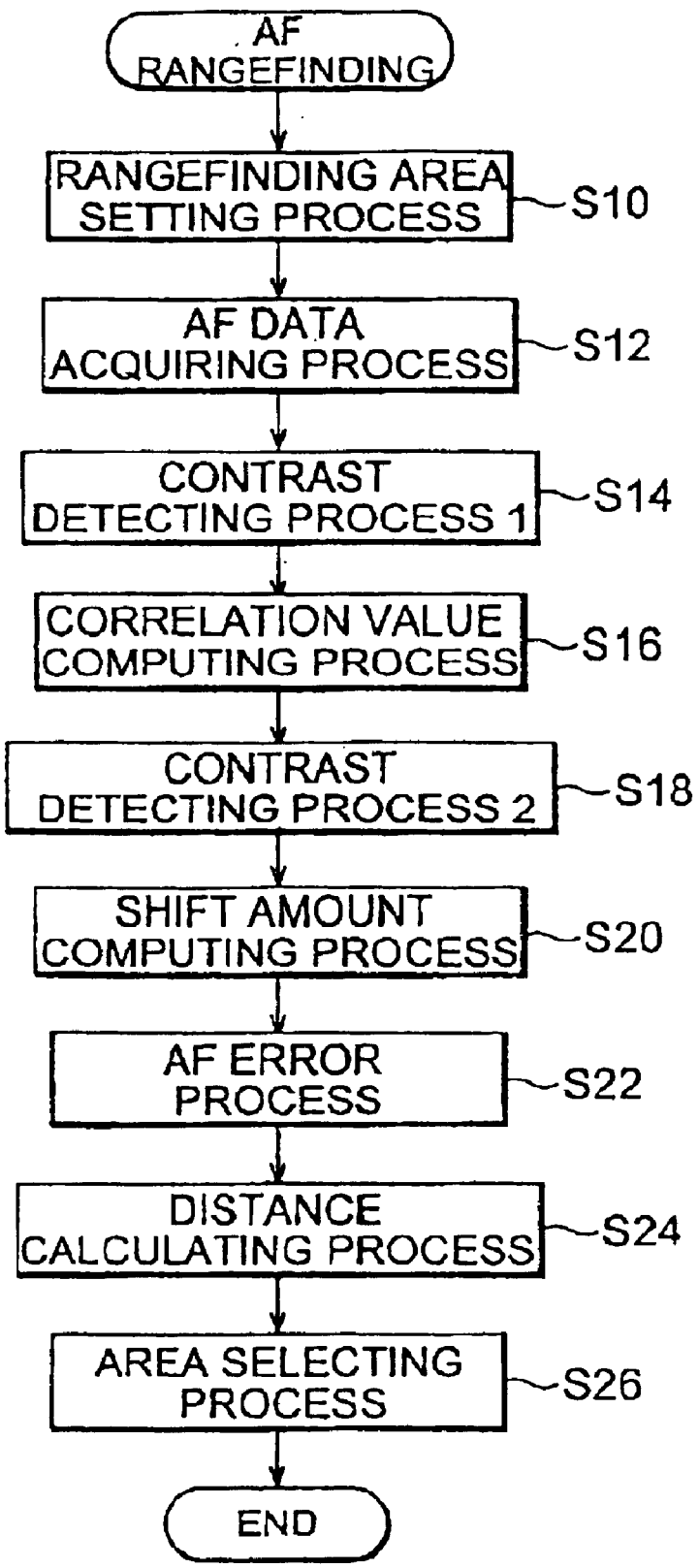
FIG. 9 is a flowchart showing an outline of a procedure of AF rangefinding in a CPU.

FIG. 9 is a flowchart showing an outline of the procedure of AF rangefinding in the CPU 60. Step S10 (Rangefinding Area Setting Process)

While the taking lens can change the focal length by driving the zoom lens barrel 12, the lens 92 for forming a sensor image onto the AF sensor 74 is a fixed-focus lens. Therefore, the rangefinding area is made variable in response to the taking lens position (angle of view). Namely, the rangefinding area is made narrower when the taking lens is located at a tele position.

Figure 10:
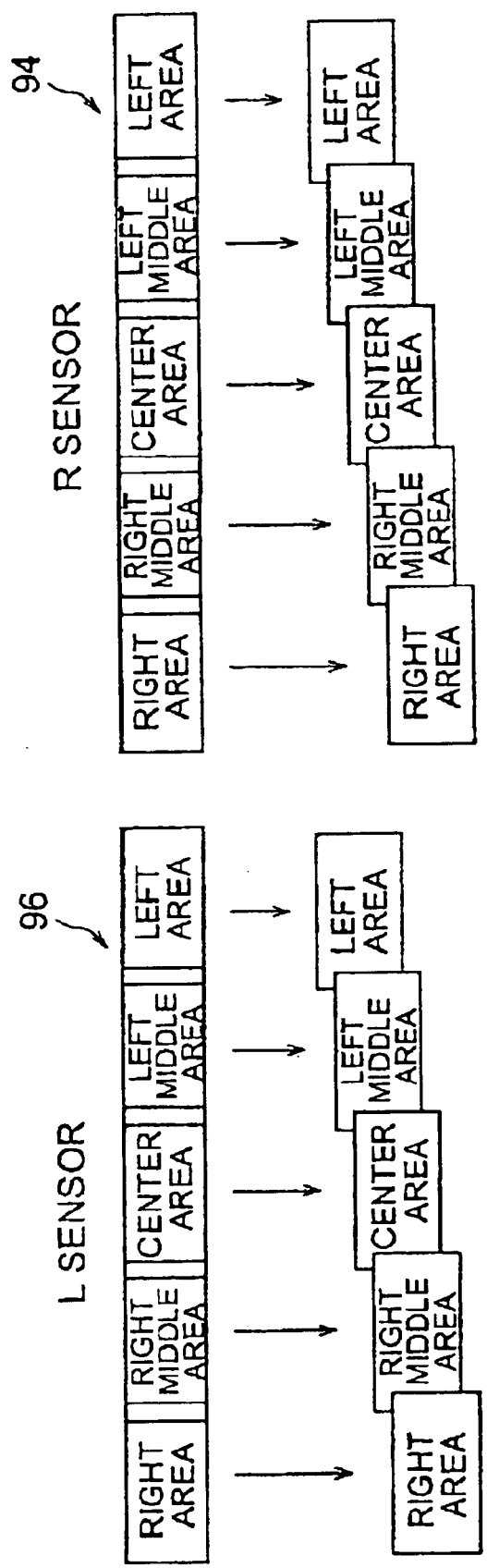
FIGS. 10A and 10B are diagrams showing divisional areas (employed sensors) in sensor regions of R and L sensors.

Here, as shown in FIGS. 10A and 10B, 5-divided areas in each of the sensor regions of the R sensor 94 and L sensor 96 are subjected to processing such as correlation value computing, whereby the object distance is calculated in each area. Letting these divided areas be referred to as "divisional areas" (employed sensor areas) in the following, the divisional areas are constituted by "right area", "right middle area", "center area", "left middle area", and "left area" as shown in the drawings. Each divisional area shares a partial region (cells) with its neighboring divisional areas. At the time of correlation value computing and the like, correlation value computing is carried out individually between corresponding divisional areas (between divisional areas having the same name) of the R sensor 94 and L sensor 96. Though each sensor region is divided into 5 divisional areas in this embodiment, it may be divided into other numbers.

Figure 11:
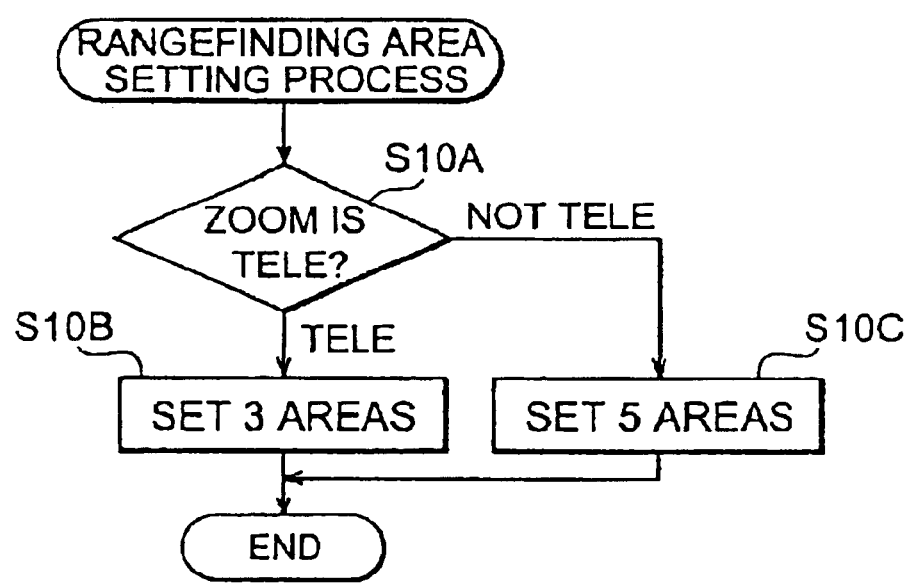
FIG. 11 is a flowchart showing a procedure of setting rangefinding areas.

The rangefinding area is an area used for rangefinding in each of the sensor regions of the R sensor 94 and L sensor 96, whereas the divisional areas are used for determining this area. Details of the rangefinding will be explained with reference to the flowchart of FIG. 11.

First, the CPU 60 acquires information about the currently set zoom position (set angle of view) from the lens barrel driving part 64, and determines whether the current zoom position is on the tele side or wide side (not tele) of a predetermined zoom position (step S10A). For example, assuming that the zoom variable range is divided into six zones of Z1 to Z6, the current zoom is determined to be on the tele side when set within the zone Z6 on the tele end side, and is determined not tele when set to the other zones Z1 to Z5. It is determined not tele when set to the macro mode.

If it is determined to be on the tele side, the rangefinding area used for rangefinding in the sensor regions (having an angle of view within the range of ±6.5°) in the R sensor 94 and L sensor 96 is restricted to an area corresponding to the angle of view of the taking lens (having an angle of view within the range of ±3.9°). Namely, when it is determined tele, a region (1) constituted by 3 divisional areas of "right middle area", "center area", and "left middle area" at the center part in the whole sensor region (5 areas) of each of the R sensor 94 and L sensor 96 is set as a rangefinding area (3-area setting) (step S10B). When it is determined not tele, on the other hand, a region (2) constituted by 5divisional areas of "right area", "right middle area", "center area", "left middle area", and "left area" is set as a rangefinding area (5-area setting) (step S10C).

Step S12 (AF Data Acquiring Process)

At step S12, methods of acquiring AF data (which will be set forth later) are switched in response to the brightness of the object.

Figure 12A:
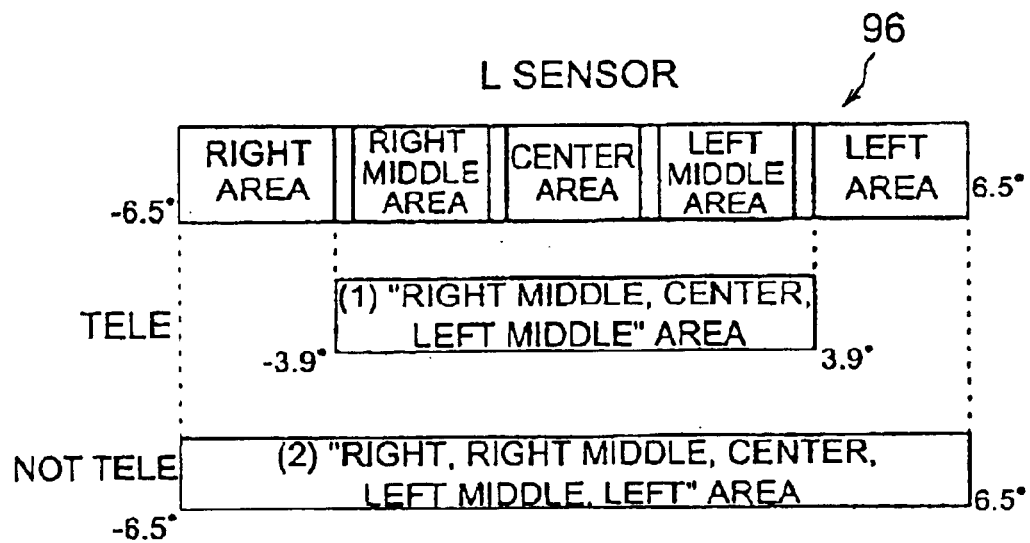
FIGS. 12A and 12B are diagrams showing rangefinding areas set to 3 and 5 areas.
Figure 12B:
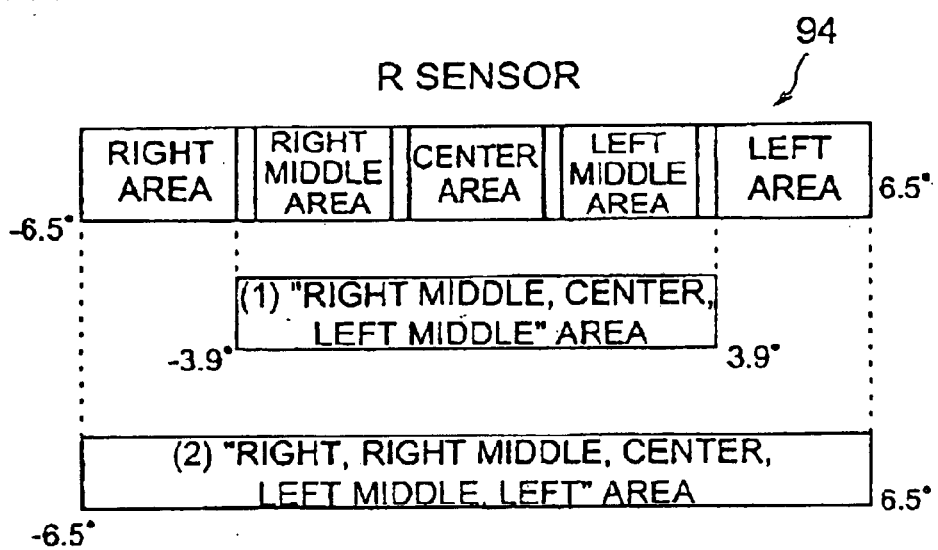

In the case where the object has an ultrahigh or high luminance, the sensitivity of AF sensor 74 (gain of luminance signal) is set low. Also, integration processing is carried out individually in the "center area", "left middle area", and "right middle area" constituting the rangefinding area (see the region (1) in FIG. 12) when the rangefinding area is set to 3 areas; and in the "center area", "left middle and left area", and "right middle and right area" constituting the rangefinding area (see the region (2) in FIG. 12) when the rangefinding area is set to 5 areas. Here, the "left middle and left area" refers to the region constituted by "left middle area" and "left area", whereas the right middle and right area" refers to the region constituted by "right middle area" and "right area" The sensitivity of AF sensor 74 is switchable between two stages of high and low levels.

Here, carrying out integration processing individually in the "center area", "left middle area" (or "left middle and left area"), and "right middle area" (or "right middle and right area") constituting the rangefinding area means that, when the sensor data of any cell within the "center area" reaches the integration terminating value, this sensor data of "center area" is acquired, and the sensor data is subsequently reset so as to start integration; when the sensor data of any cell within the "left middle area" (or "left middle and left area") reaches the integration terminating value, this sensor data of "left middle area" (or "left middle and left area") is acquired, and the sensor data is subsequently reset so as to start integration; and when the sensor data of any cell within the "right middle area" (or "right middle and right area") reaches the integration terminating value, this sensor data of "right middle area" (or "right middle and right area") is acquired. Thus, integration processing is individually carried out in a plurality of regions, whereby, even if sensor data of any region becomes inappropriate because of light having a high luminance or the like incident thereon, effective sensor data can be acquired from other regions.

When the object has a medium luminance, the sensitivity of the AF sensor 74 is set low, and integration processing is collectively carried out in the rangefinding area set to 3 or 5 areas. In the case set to 3 areas, for example, integration processing is carried out simultaneously in the "center area", "left middle area", and "right middle area" constituting the rangefinding area (see the region (1) in FIG. 12), and when the sensor data of any cell within the "center area", "left middle area", and "right middle area" reaches the integration terminating value, sensor data of "center area", left middle area", and "right middle area" are acquired collectively.

When the object has a low luminance, the sensitivity of AF sensor 74 is set high, and integration processing is carried out collectively in the rangefinding area set to 3 or 5 areas. If the sensor data of a cell within the rangefinding area does not reach the integration terminating value even after the lapse of a predetermined integration time, the integration is terminated and then is restarted with the sensitivity of AF sensor 74 switched to the low level, while auxiliary light for autofocus is emitted from the flash apparatus 72 (AF pre-emission). In this case, integration processing is collectively carried out in the rangefinding area set to 3 or 5 areas.

A process of generating AF data from sensor data will now be explained. Assuming that the data outputted from the light-receiving cell of the AF sensor 74 is the sensor data as mentioned above, there seem to be two cases, i.e., a case where the individual sensor data outputted from the AF sensor 74 are acquired by an AID converter circuit, so that thus acquired A/D-converted value of sensor data itself is employed as AF data used in each of subsequent processes in the CPU 60; and a case where sensor data subjected to a predetermined process for improving the accuracy in rangefinding is employed as AF data. In the former case, no particular processing for generating AF data is necessary in the CPU 60, whereby a process of acquiring sensor data becomes a process of acquiring AF data. In the latter case, by contrast, a specific process is carried out for generating AF data in the CPU 60 after the sensor data is acquired. For example, in the latter case, sensor data subjected to contrast extraction can be used as AF data used in each of the subsequent processes. The processing in the case where AF data is generated by subjecting sensor data to contrast extraction so as to generate AF data will now be explained.

When a cell having a certain cell number (address i) is taken into account, for example, the contrast extraction process is an arithmetic operation for calculating the difference between the sensor data of this cell and the sensor data of a cell having a sensor number (i+m) separated from the former cell by m cells (m pixels). In other words, it is a process for calculating the difference between each of the respective sensor data items obtained from the R sensor 94 and L sensor 96. and the sensor data shifted therefrom by m pixels. Namely, letting R(i) be the sensor data of a cell having a sensor number (i) in the R sensor 94, and L(i) be the sensor data of a cell having a sensor number (i) in the L sensor 96, an arithmetic operation of the following expression:

$$R(i)-R(i+m) \quad (1)$$

is carried out for the sensor data of R sensor 94, whereas an arithmetic operation of the following expression:

$$L(i)-L(i+m) \quad (2)$$

is carried out for the sensor data of L sensor 96. Thus obtained differential data indicates the contrast of the sensor image captured by each cell of the AF sensor 74. In this specification, the arithmetic operation for calculating data indicative of the contrast by the sensor data difference of two pixels will be referred to as two-pixel differential operation.

Though the cell gap m of two sensor data items yielding a difference can be set to a desirable set value, m=2 in the following explanation. Since the electric charge accumulated in cells having even sensor numbers and the electric charge accumulated in a cells having odd sensor numbers in the AF sensor 74 are transmitted through respective channels different from each other so as to be processed, m is desirably an even number so that the differential data be determined from the sensor data of cells in the same channel. Though the number of data items determined by the above-mentioned expressions (1) and (2) decreases by m as compared with that obtained from the AF sensor 74 in the CPU 60, a necessary number of AF data items can be secured if the data acquiring range is expanded beforehand in view of the decrease by m.

Though the differential data obtained by the above-mentioned expressions (1) and (2) have conventionally been employed as AF data, the differential data having +128 further added thereto are employed as AF data in this embodiment. Namely, letting AFR(i) be the AF data corresponding to the sensor number i of the R sensor 94, and AFL(i) be the AF data corresponding to the sensor number i of the L sensor 96, values obtained by the following expressions:

$$AFR(i)=(128+R(i-1)-R(i+1)) \quad (3a)$$

$$AFL(i)=(128+L(i-1)-L(i+1)) \quad (3b)$$

are employed as AF data when m=2.

Step S14 (Contrast Detecting Process 1)

At step S14, it is determined whether the AF data acquired at step S12 have a contrast necessary for rangefinding or not. If it is determined that the AF data does not have a contrast necessary for rangefinding (determined that the contrast is low), rangefinding is disabled.

When 3 areas are set as the rangefinding area in the rangefinding area setting process at step S10, the contrast determination is carried out in each of the divisional areas of right middle area, center area, and left middle area, and then processing such as correlation value computing using AF data of divisional areas determined to have a low contrast is not performed. Similarly, when 5 areas are set as the rangefinding area, the contrast determination is carried out in each of the divisional areas of right area, right middle area, center area, left center area, and left area, and then processing such as correlation value computing using AF data of divisional areas determined to have a low contrast is not performed.

Step S16 (Correlation Value Computing Process)

At step S16, correlation value computing is carried out between respective sensor images (AF data) taken from the R sensor 94 and L sensor 96 of the AF sensor 74, and the amount of deviation of sensor images (shift amount between right and left AF data) yielding the highest correlation is determined. The distance to the object can be calculated from the shift amount between the right and left AF data.

When 3 areas are set as the rangefinding area, correlation value computing is carried out in each of the divisional areas of right middle area, center area, and left middle area. When 5 areas are set as the rangefinding area, correlation value computing is carried out in each of the divisional areas of right area, right middle area, center area, leftmiddle area, and left area. Here, no correlation value computing is performed in the divisional areas determined to be of a low contrast (incapable of rangefinding) at step S14 mentioned above.

The above-mentioned correlation value computing will now be explained with reference to FIG. 13.

Figure 13:
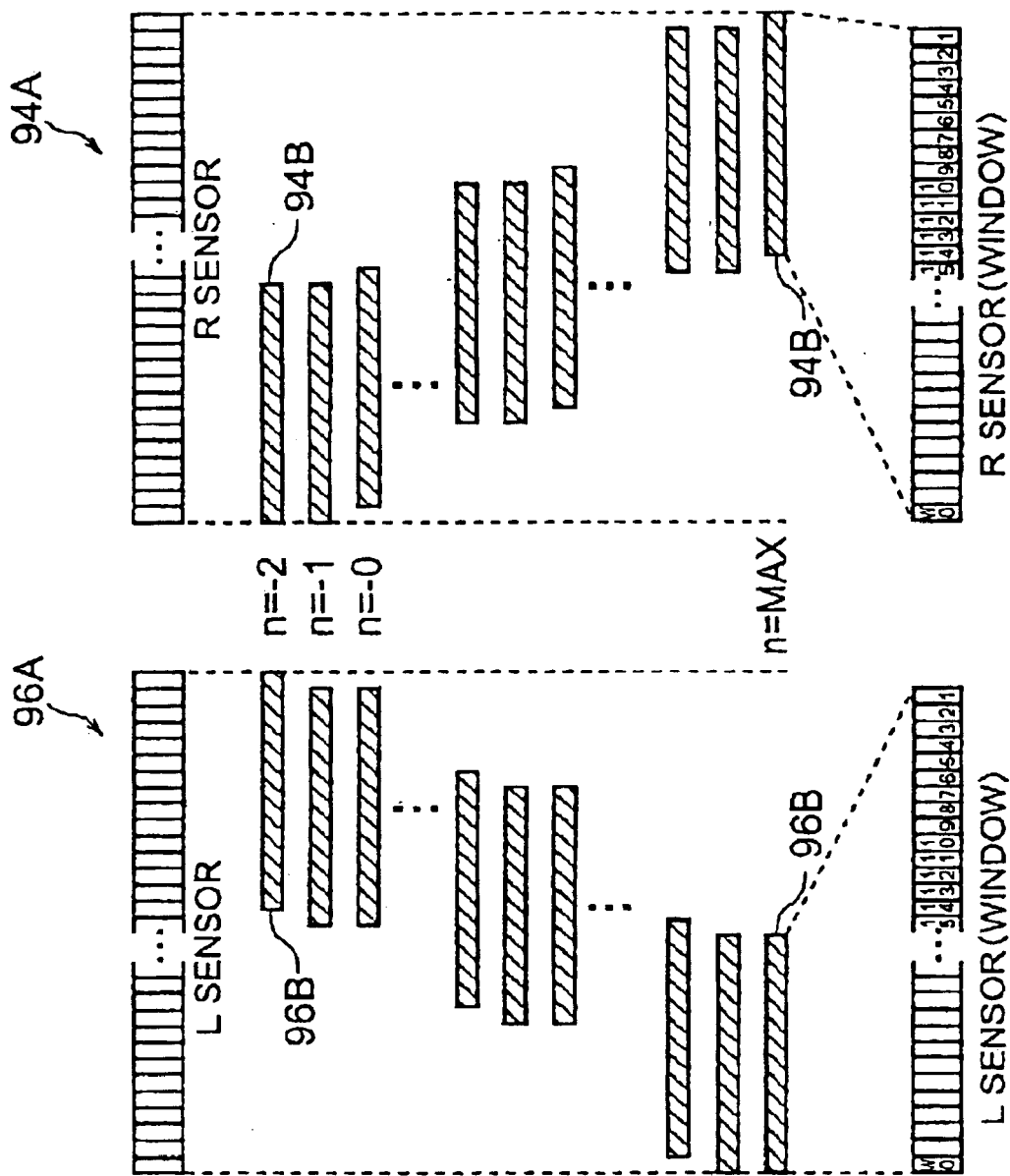
FIG. 13 is a diagram for explaining correlation value computing.

In FIG. 13, 94A and 96A are sensors in certain divisional areas (hereinafter referred to as "employed sensors") in the R sensor 94 and L sensor 96, respectively. On the other hand, 94B and 96B are R and L windows for extracting AF data used for correlation value computing from AF data of the employed sensors 94A and 96A, respectively. In the present invention the "window area" or simply the "window" means an area of each employed sensor corresponding to a row of the predetermined number (in this embodiment, such number is represented by "wo") of light-receiving elements that belong to the employed sensor.

Letting n (n=−2, −1, 0, 1, . . . , MAX (=38)) be the amount of shift between the R window 94B and L window 96B, when n=−2, the R window 94B is positioned at the left end of the employed sensor 94A whereas the L window 96B is positioned at the right end of the employed sensor 96A. When n=−1, the L window 96B shifts leftward by 1 cell from the right end of the employed sensor 96A. When n=0, the R window 94B shifts rightward by 1 cell from the left end of the employed sensor 94A. Similarly, the R window 94B and L window 96B alternately move by 1 cell each time n increases by 1. When n=MAX, the R window 94B is positioned at the right end of the employed sensor 94A whereas the L window 96B is positioned at the left end of the employed sensor 96A.

Letting f(n) be the correlation value at a certain shift amount n between the R window 94B and L window 96B, the correlation value f(n) can be represented by the following expression:

$$f(n) = \sum_{i=1}^{wo} |AFL(i) - AFR(i)| \quad (4)$$

where i is the number indicating the position of cell within a window (i=1, 2, . . . , wo (=42)), and AFR(i) and AFL(i) are AF data obtained from the respective cells at the same cell position i of the R window 94B and L window 96B. Namely, as shown in expression (4), the correlation value f(n) is the sum of absolute values of differences in AF data obtained from the cells at the same cell positions of R window 94B and L window 96B, and is closer to zero as the correlation is higher.

Therefore, when the correlation value f(n) is determined while changing the shift amount n, the distance to the object can be determined from the shift amount n minimizing the correlation value f(n) (yielding the highest correlation). Here, object images are formed on the R sensor 94 and L sensor 96 such that the correlation is the highest when the shift amount n=0 in the case where the object is at infinity, and when the shift amount n=MAX in the case where the object distance is at the near end. Not only the above-mentioned expression (4) but also other arithmetic expressions can be used as an arithmetic expression for determining the correlation. In the latter case, the correlation value may become greater as the correlation is higher. In such a case, the magnitude relation concerning correlation values in the subsequent explanation is reversed. For example, the correlation value yielding the highest correlation becomes the maximum value, whereas statements such as small or large can be employed after being reversed to those of large or small.

Step S18 (Contrast Detecting Process 2)

While step S14 determines whether the AF data within divisional areas have a contrast necessary for rangefinding or not, step S18 determines whether the AF data within the window area at the shift amount n yielding the highest correlation have a contrast necessary for rangefinding or not. When it is determined that the contrast is low, rangefinding is disabled, and no rangefinding is carried out according to the shift amount n at that time.

Step S20 (Shift Amount Computing Process)

At step S20, according to the correlation value calculated at step S16, the shift amount χ yielding the highest correlation is computed. Details of the shift amount computing will be explained later.

Step S22, (AF Error Process)

At step S22, when it is determined that all the rangefinding areas set to 3 or 5 areas are incapable of rangefinding, the taking lens is set so as to focus at a preset object distance.

Namely, when auxiliary light for autofocus is emitted while an error is detected because of a deficiency in AF data amount in all the rangefinding areas, the taking lens is set so as to focus at infinity.

When auxiliary light for autofocus is emitted while an error is detected because of a deficiency in AF data amount in all the rangefinding areas, focusing is changed to a flash-reachable fixed-focus set distance according to the film sensitivity. For example, the fixed-focus set distance is set to 6 m at ISO of 400 or higher, and 3 m at ISO of less than 400. Further, the fixed-focus set distance for focusing may be changed according to kinds of errors.

Step S24 (Distance Calculating Process)

At step S24, the object distance is calculated according to the shift amount χ computed at step S20. Here, the object distance is calculated in each of all the employed sensor areas set to 3 or 5 areas.

Step S26 (Area Selecting Process)

In the case where no error occurs during the AF rangefinding process, 3 object distances are calculated at the time when 3 areas are set, whereas 5 object distances are calculated at the time when 5 areas are set. When a plurality of object distances are calculated, the shortest object distance is employed in principle.

While 5 object distances are calculated when 5 areas are set, if the object distance corresponding to one of left and right areas becomes a very short distance whereas all the object distances corresponding to the other areas are longer than a medium distance, the shortest object distance in the object distances longer than the medium distance is employed without employing the very short distance.

The rangefinder apparatus in accordance with this embodiment is characterized in the correlation value computing process (step S16 in FIG. 9) and shift amount computing process (step S20 in FIG. 9). Therefore, details of the correlation value computing process and shift amount computing process will be explained in the following.

Details of Correlation Value Computing Process (step S16 in FIG. 9)

In the correlation value computing process, the correlation value yielding the highest correlation is determined. Here, a correlation local minimum value yielding a local minimum value is determined from correlation values obtained as discrete data, and this correlation local minimum value is interpolated by utilizing correlation values thereabout, so as to compute a local minimum value of correlation value with a higher accuracy. The flow of this process will be explained with reference to the flowcharts of FIGS. 14 and 15. In the following explanation, the correlation value obtained by interpolating the correlation local minimum value in the correlation value computing process will be referred to as interpolated correlation local minimum value.

First, according to the above-mentioned expression (4), correlation value computing is carried out for each divisional area (step S1600).

Subsequently, it is determined whether a plurality of correlation local minimum values exist in the relevant divisional area (step S1602). A correlation value determined to be a local minimum value becomes smaller than any of correlation values of shift amounts adjacent to its shift amount.

Figure 15:
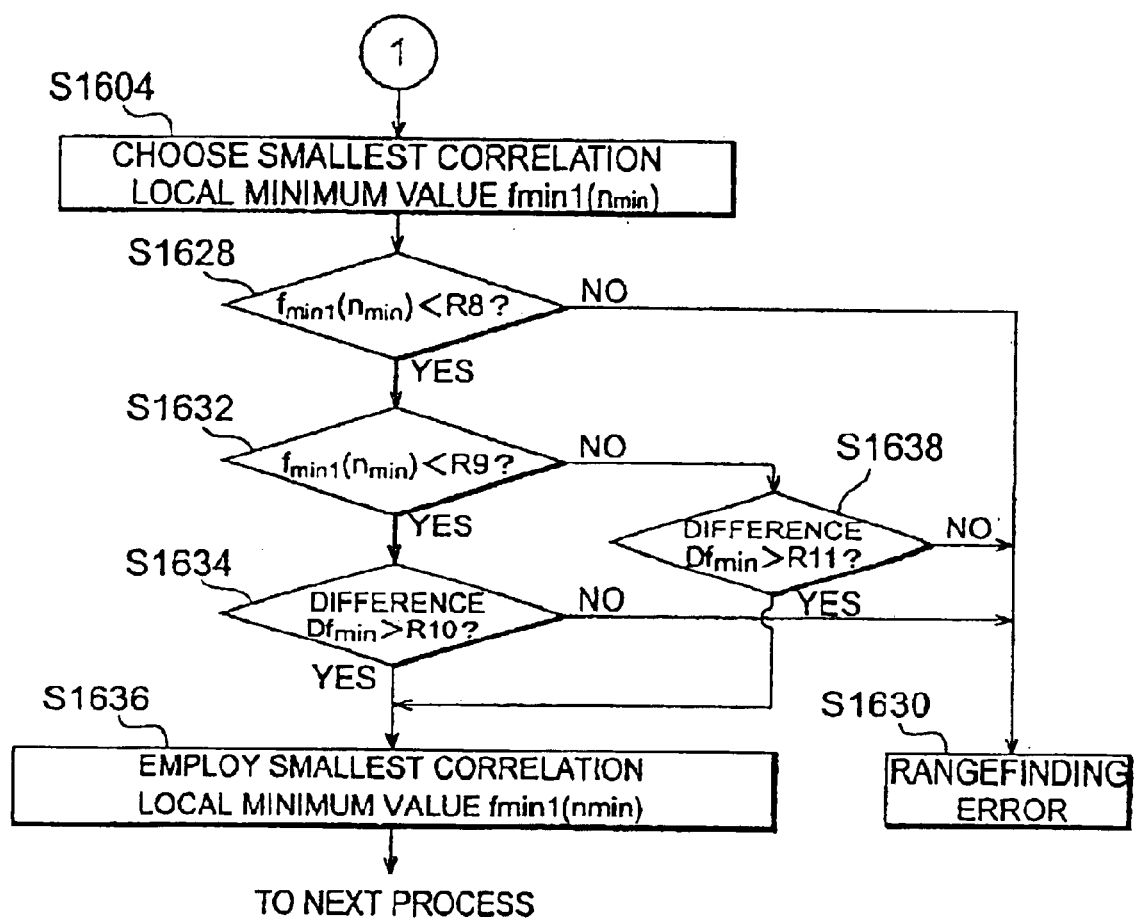
FIG. 15 is a second flowchart for explaining a procedure of correlation value computing.

If it is determined that a plurality of local minimum values do not exist at step S1602, the flow proceeds to step S1604 in FIG. 15, at which the correlation local minimum value $f_{min1}$ ($n_{min}$) not interpolated is chosen as the highest correlation value. If it is determined that a plurality of local minimum values exist at step S1602, by contrast, the flow proceeds to step S1606. At step S1606, the oscillation degree W of AF data is detected. For detecting the oscillation degree W, the following expression (5) is used:

$$W = (C1L + C1R)/\Delta CONT > R1 \quad (5)$$

In expression (5), C1L is represented by $$C1L = \sum_{i=1}^{S} |AFL(i) - AFL(i-1)| \quad (6)$$

and indicates the sum of absolute values of differences between adjacent AF data within the L employed sensor area. Here, S is the total number of light-receiving elements in the L employed sensor area.

On the other hand, in expression (5), C1R is represented by $$C1R = \sum_{i=1}^{S} |AFR(i) - AFR(i-1)| \quad (7)$$

and indicates the sum of absolute values of differences between adjacent AF data within the R employed sensor area. Here, S is the total number of light-receiving elements in the R employed sensor area.

In expression (5), ΔCONT is represented by $$\Delta CONT = (AFRMAX - AFRMIN) + (AFLMAX - AFLMIN). \quad (8)$$

In equation (8), AFRMAX and AFRMIN are the absolute maximum value and absolute minimum value of AF data in the R employed sensor, respectively. Similarly, AFLMAX and AFLMIN are the absolute maximum value and absolute minimum value of AF data in the L employed sensor, respectively.

If it is determined according to expression (5) that the oscillation degree W of AF date is smaller than a predetermined reference value R1, the flow proceeds to step S1604 in FIG. 15, which utilizes a plurality of correlation local minimum values $f(n_{min})$ and chooses the smallest correlation local minimum value $f_{min1}(n_{min})$ exhibiting the highest correlation therefrom.

If it is determined according to expression (5) that the oscillation degree W of AF data is greater than the predetermined reference value R1 and that the correlation values are not reliable, the flow proceeds to step S1608.

At step S1608, the smallest correlation local minimum value (first correlation extreme value) $f_{min1}(n_{min})$ and the second smallest correlation local minimum value $f_{min2}(n_{min})$ (second correlation extreme value) are detected, and the ratio T of the second smallest correlation local minimum value to the smallest correlation local minimum value is compared with a predetermined reference value R2. In other word, a difference between the smallest correlation local minimum value and the second smallest correlation local minimum value normalized by the smallest correlation local minimum value is compared with a reference value.

If it is determined according to expression (9) that their ratio T is greater than the predetermined reference value R2, the flow proceeds to step S1604 in FIG. 15, which utilizes a plurality of correlation local minimum values $f(n_{min})$ and chooses the smallest correlation local minimum value $f_{min1}$ $(n_{min})$ exhibiting the highest correlation therefrom.

$$T=f_{min2}/f_{min1}<R2 \qquad (9)$$

If it is determined that the ratio T is smaller than the predetermined reference value R2 and that the correlation local minimum values are not reliable, by contrast, the flow proceeds to step S1610. Instead of the ratio T of the second correlation local minimum value $f_{min2}(n_{min})$ to the smallest correlation local minimum value $f_{min1}(n_{min})$, their difference may also be used for carrying out the determination at step S1608.

With reference to FIGS. 16A–16C and 17A–17C, the detection of oscillation degree W at step S1606 and the determination process of ratio T at step S1608 will now be explained in terms of their specific examples.

Figure 16A:
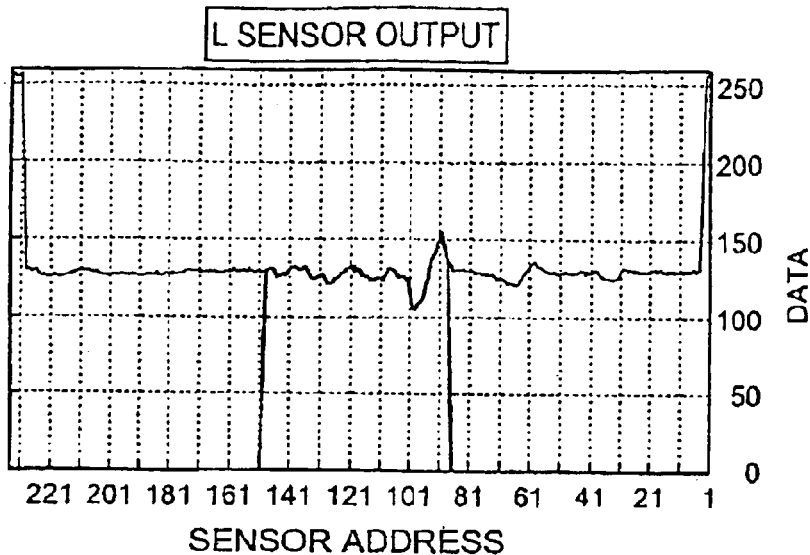
FIGS. 16A–16C are charts for explaining a process of detecting the oscillation degree W of AF data, and a process of determining the ratio T of the second smallest correlation local minimum value to the smallest correlation local minimum value.
Figure 16B:
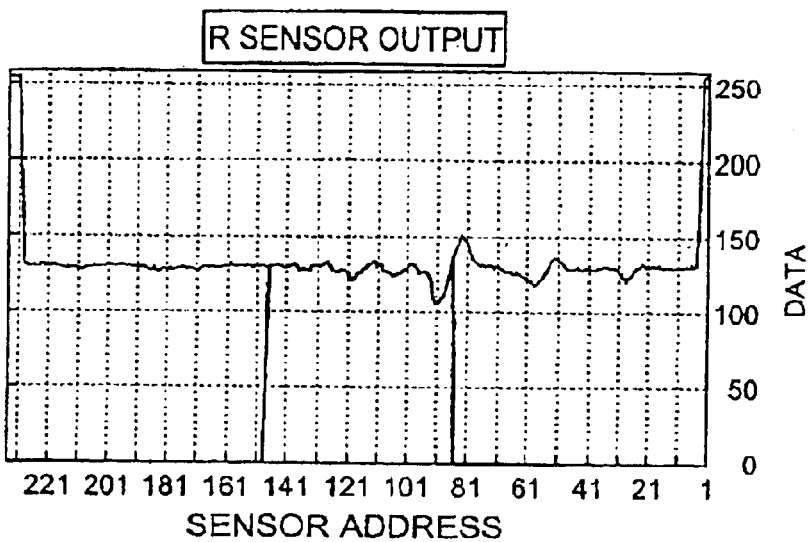
Figure 16C:
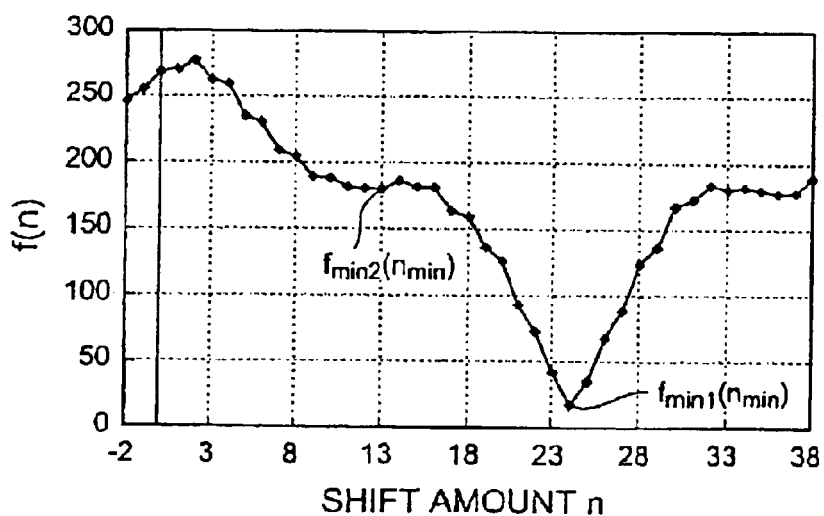

FIGS. 16A and 16B show respective examples of L and R sensor outputs at the time when light from a certain object is received by the AF sensor 74. FIG. 16C is a graph showing the correlation value at the time when such sensor outputs are obtained.

In the case shown in FIGS. 16A–16C, the above-mentioned C1L and C1R are 108 and 82, respectively. On the other hand, (AFLMAX−AFLMIN) is 45, whereas (AFRMAX−AFRMIN) is 32, whereby the above-mentioned ΔCONT is 77. Therefore, the oscillation degree W of AF data shown in expression (5) is 2.4675. Also, the smallest local minimum value $f_{min1}(n_{min})$ is 19, whereas the second smallest local minimum value $f_{min2}(n_{min})$ is 180, whereby the ratio T in expression (9) becomes 9.4737.

Figure 17A:
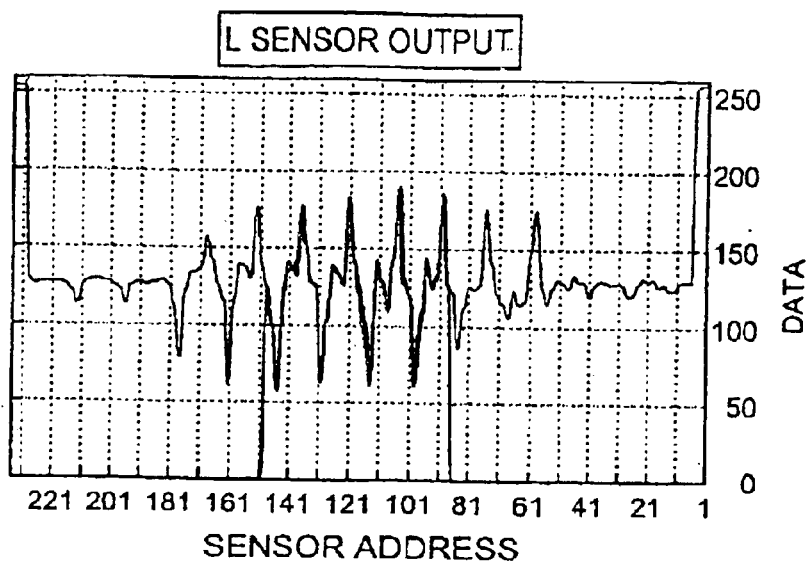
FIGS. 17A–17C are charts for explaining a process of detecting the oscillation degree W of AF data, and a process of determining the ratio T of the second smallest correlation local minimum value to the smallest correlation local minimum value.
Figure 17B:
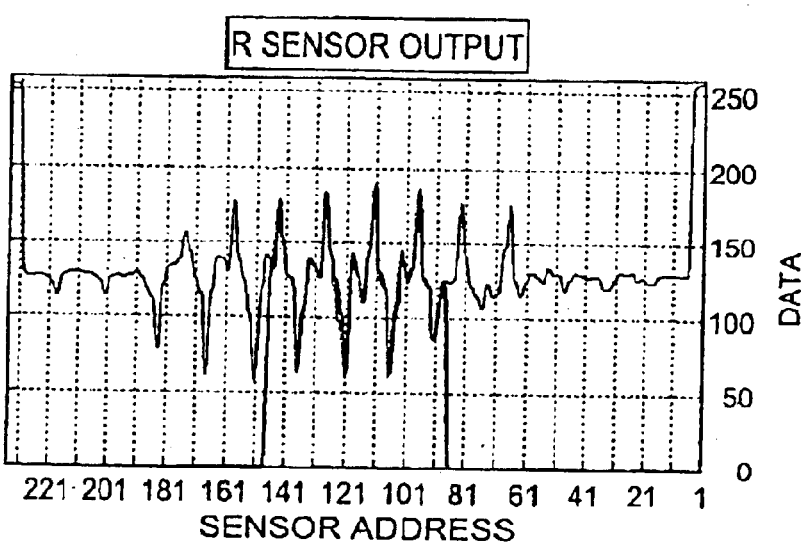
Figure 17C:
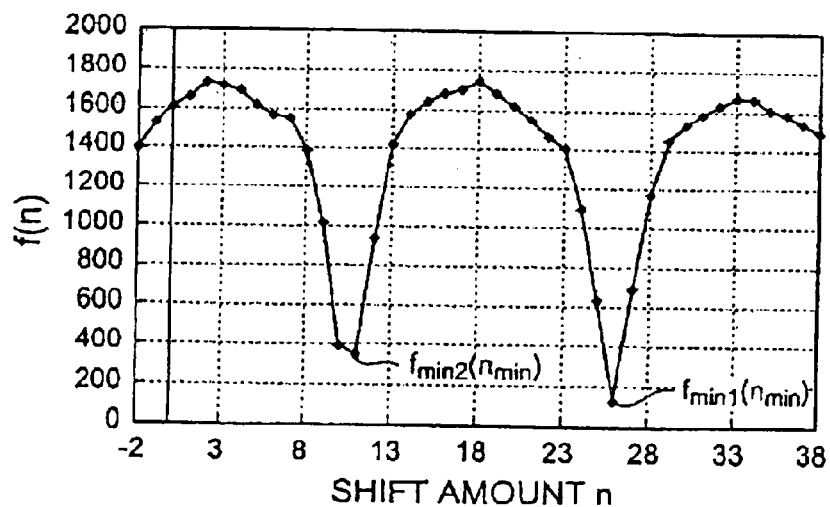

On the other hand, FIGS. 17A and 17B show respective examples of L and R sensor outputs at the time when light from another object is received by the AF sensor 74. FIG. 17C is a graph showing the correlation value at the time when such sensor outputs are obtained.

In the case shown in FIGS. 17A–17C, the above-mentioned C1L and C1R are 1054 and 941, respectively. on the other hand, (AFLMAX−AFLMIN) is 127, whereas (AFRMAX−AFRMIN) is 126, whereby the above-mentioned ΔCONT is 253. Therefore, the oscillation degree W of AF data shown in expression (5) is 7.885. Also, the smallest local minimum value $f_{min1}(n_{min})$ is 136, whereas the second smallest local minimum value $f_{min2}(n_{min})$ is 380, whereby the ratio T represented by expression (9) becomes 2.7941.

If the reference value R1 for determining the oscillation degree W is set to 3.0, for example, in the case shown in FIGS. 16A–16C, no subsequent interpolation process is performed since the oscillation degree W is smaller than R1, and the flow proceeds to step S1604 in FIG. 15, which utilizes a plurality of correlation local minimum values $f(n_{min})$ and chooses the smallest correlation local minimum value $f_{min1}(n_{min})$ exhibiting the highest correlation therefrom. When the oscillation degree W of AF data is low as such, the fear of causing erroneous rangefinding is small, whereby the rangefinding time can be restrained from increasing if the arithmetic operation for interpolation is avoided. If the reference value R2 for determining the ratio T is set to 5, for example, the ratio T is greater than the reference value R2 in the case shown in FIGS. 16A–16C, whereby the subsequent interpolation process will not be carried out from this viewpoint as well.

In the case shown in FIGS. 17A–17C, by contrast, the oscillation degree W is greater than R1, whereby the flow proceeds from step S1606 to step S1608. At step S1608, the ratio T of the second smallest correlation local minimum value $f_{min2}(n_{min})$ to the smallest correlation local minimum value $f_{min1}(n_{min})$ is compared with the predetermined reference value R2. In the case shown in FIGS. 17A–17C, the ratio T is smaller than R2. As a consequence, it is determined that the difference between the smallest correlation local minimum value $f_{min1}(n_{min})$ and the second smallest correlation local minimum value $f_{min2}(n_{min})$ is not adequately large, whereby the flow proceeds to step S1610, at which the correlation value interpolation amount Δf is computed.

Thus, in each of the cases where the oscillation degree W of AF data is smaller than the predetermined reference value R1 and where the ratio of the second smallest correlation local minimum value $f_{min2}(n_{min})$ to the smallest correlation local minimum value $f_{min\ 2}(n_{min})$ is greater than the predetermined reference value R2, no subsequent interpolation process is carried out in the rangefinder apparatus in accordance with this embodiment, so that the flow proceeds to step S1604 in FIG. 15, which utilizes a plurality of correlation local minimum values $f(n_{min})$ before interpolation and chooses the smallest correlation local minimum value $f_{min1}$ $(n_{min})$ exhibiting the highest correlation therefrom. This dispenses with an interpolation process which accompanies numerous arithmetic operations, whereby the rangefinding time can be restrained from increasing. The reference values R1 and R2 can be set to desirable values.

Reference is made to the flowchart of FIG. 14 again. At step S1610, the interpolation amount Δf for interpolating the correlation local minimum value $f(n_{min})$ is computed. In the process of computing the interpolation amount Δf, the CPU 60 carries out the following operations.

First, with respect to the shift amount $n_{min}$ yielding the correlation local minimum value $f(n_{min})$ in employed sensors, it is determined whether the correlation value $f(n_{min}-1)$ of the shift amount $n_{min}-1$ is greater or smaller than the correlation value $f(n_{min}+1)$ of the shift amount $n_{min}+1$ as shown in FIGS. 18 to 21. (I) In the case where $f(n_{min}-1)>f(n_{min}+1)$ $$f(n_{min}-1)>f(n_{min}+1) \qquad (10)$$

First, it is determined whether the above-mentioned expression (10) is satisfied or not. If the above-mentioned expression (10) is satisfied, it is further determined whether the relationship of the following expression:

$$f(n_{min}+1)<f(n_{min}+2) \qquad (11)$$

is satisfied or not.

If expression (11) is satisfied, the interpolation amount Δf for a correlation local minimum value is computed according to the following expression:

$$\Delta f=(5f(n_{min}-1)-f(n_{min})-3f(n_{min}+1)-f(n_{min}+2))/8 \qquad (12)$$

provided that, when Δf<0, Δf 0.

Figure 18:
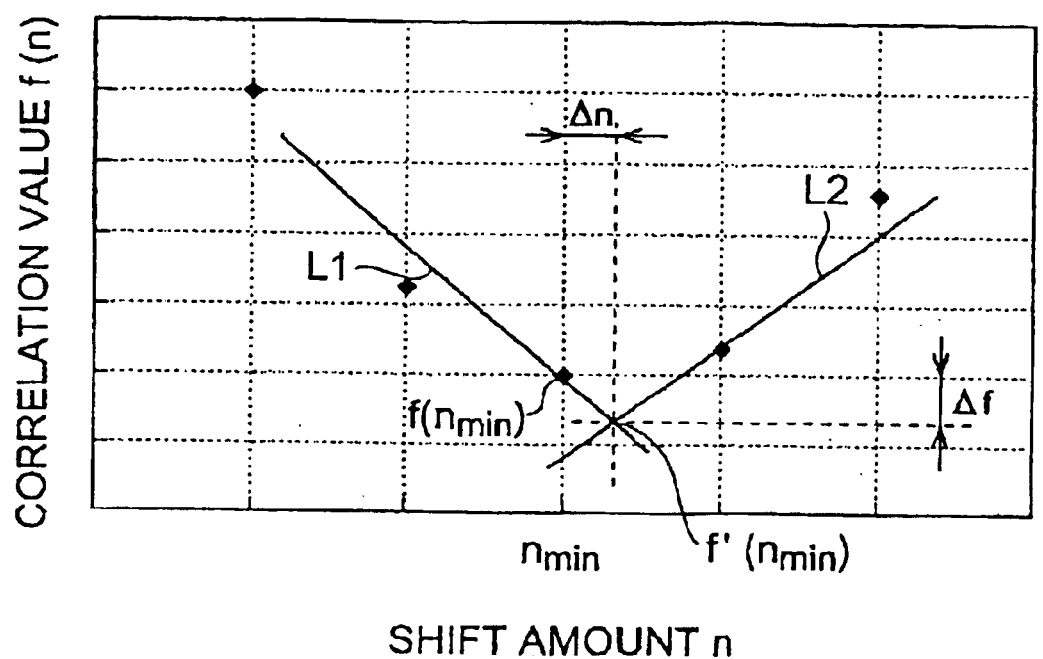
FIG. 18 is a first chart for explaining a process of interpolating correlation local minimum values.

When an intersection between a line L1 with a gradient determined by $(n_{min}-1)$, $f(n_{min})$, $(n_{min}+1)$ and $(n_{min}+2)$ passing a point of the correlation local minimum value $f(n_{min})$ of the shift amount $n_{min}$ and a line L2 passing a point of the correlation value $f(n_{min}+1)$ of the shift amount $(n_{min}+1)$ while having a gradient with the same absolute value as that of the line L1 and the opposite polarity is determined as shown in FIG. 18, the interpolation amount Δf indicates the difference between the correlation value at this intersection and the correlation local minimum value $f(n_{min})$.

As shown in FIG. 18, this arithmetic expression (12) is derived from expressions of the lines L1 and L2 as the above-mentioned interpolation expressions. The expression of line L1 is represented by $$y=-[f(n_{min}-1)-f(n_{min})+0.25\{(f(n_{min}-1)-f(n_{min}))-(f(n_{min}+2)-f(n_{min}+1))\}]x+f(n_{min}), \quad (13)$$

whereas the expression of line L2 is represented by $$y=[f(n_{min}-1)-f(n_{min})+0.25\{(f(n_{min}-1)-f(n min))-(f(n_{min}+2)-f(n_{min}+1))\}]x+f(n_{min}+1)-[f(n_{min}-1)-f(n_{min})+0.25\{(f(n_{min}-1)-f(n_{min}))-(f(n_{min}+2)-f(n_{min}+1))\}] \quad (14)$$

Therefore, the interpolation amount $\Delta f$ can be determined by calculating $f(n_{min})$ by erasing x from the above-mentioned interpolation expressions (13) and (14).

If expression (11) is not satisfied, on the other hand, the interpolation amount $\Delta f$ is computed according to the following expression:

$$\Delta f=(f(n_{min}-1)-f(n_{min}+1))/2 \quad (15)$$

Figure 19:
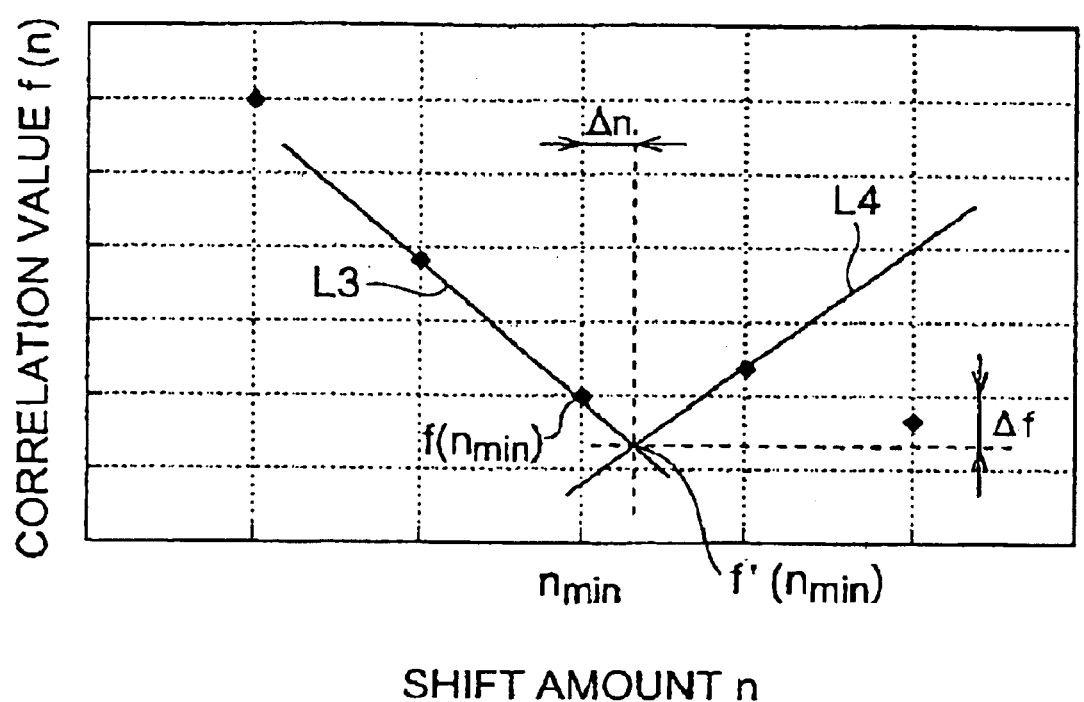
FIG. 19 is a second chart for explaining a process of interpolating correlation local minimum values.

When an intersection between a line L3 passing a point of the correlation local minimum values $f(n_{min})$ of shift amount $n_{min}$ and a point of the correlation value $f(n_{min}-1)$ of shift amount $n_{min}-1$, and a line L4 passing a point of the correlation value $f(n_{min}+1)$ of the shift amount $n_{min}+1$ while having a gradient with the same absolute value as that of the line L3 and the opposite polarity is determined as shown in FIG. 19, the interpolation amount $\Delta f$ indicates the difference between the correlation value at this intersection and the correlation local minimum value $f(n_{min})$.

As shown in FIG. 19, this arithmetic expression (15) is derived from expressions of the lines L3 and L4 as the above-mentioned interpolation expressions. The expression of line L3 is represented by $$y=-[f(n_{min}-1)-f(n_{min})]x+f(n_{min}), \quad (16)$$

whereas the expression of line L4 is represented by $$y=[f(n_{min}-1)-f(n_{min})]x+f(n_{min}+1)-(f(n_{min}-1)-f(n_{min})). \quad (17)$$

Therefore, the interpolation amount $\Delta f$ can be determined by calculating $f(n_{min})$ by erasing x from the above-mentioned interpolation expressions (16) and (17). (II) In the case where $f(n_{min}-1) \leq f(n_{min}+1)$ $$f(n_{min}-1) \leq f(n_{min}+1) \quad (18)$$

If the above-mentioned expression (10) is not satisfied, i.e., the above-mentioned expression (18) is satisfied, it is further determined whether the relationship of the following expression:

$$f(n_{min}-1)<f(n_{min}-2) \quad (19)$$

is satisfied or not.

If expression (19) is satisfied, the interpolation amount $\Delta f$ for a correlation local minimum value is computed according to the following expression:

$$\Delta f=(5f(n_{min}+1)-f(n_{min})-3f(n_{min}-1)-f(n_{min}-2))/8 \quad (20)$$

provided that, when $\Delta f<0$, $\Delta f=0$.

Figure 20:
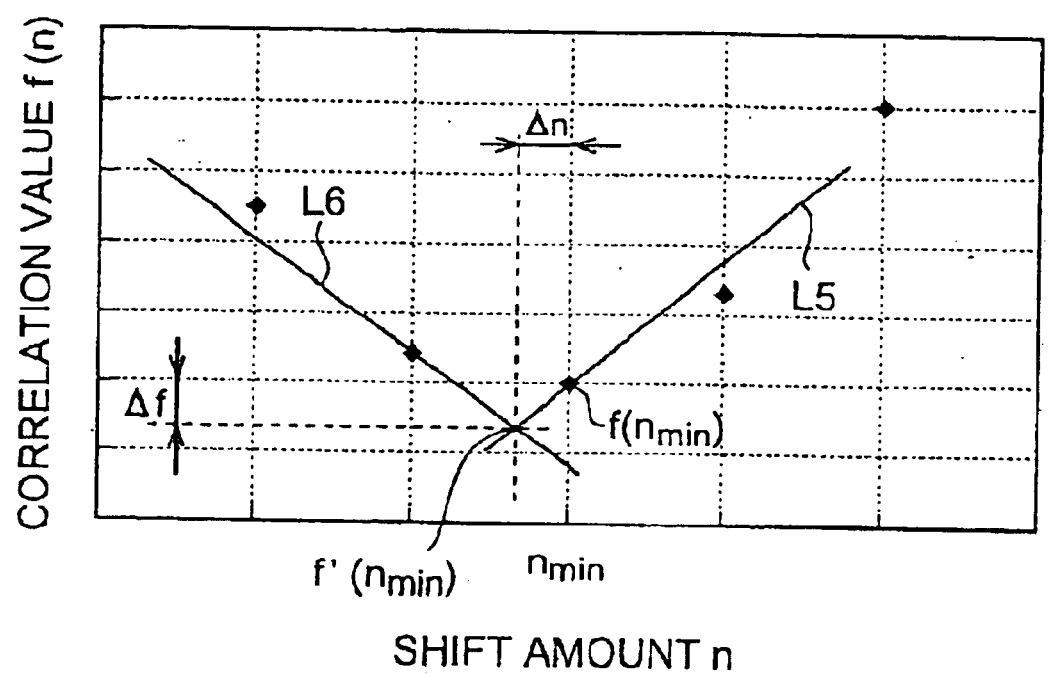
FIG. 20 is a third chart for explaining a process of interpolating correlation local minimum values.

When an intersection between a line L5 with a gradient determined by $(n_{min}-2)$, $(n_{min}-1)$, $f(n_{min})$ and $(n_{min}+1)$ passing a point of the correlation local minimum value $f(n_{min})$ of the shift amount $n_{min}$ and a line L6 passing a point of the correlation value $f(n_{min}-1)$ of the shift amount $(n_{min}-1)$ while having a gradient with the same absolute value as that of the line L5 and the opposite polarity is determined as shown in FIG. 20, the interpolation amount $\Delta f$ indicates the difference between the correlation value at this intersection and the smallest correlation local minimum value $f(n_{min})$.

As shown in FIG. 20, this arithmetic expression (20) is derived from expressions of the lines L5 and L6 as the above-mentioned interpolation expressions. The expression of line L5 is represented by $$y=[f(n_{min}+1)-f(n_{min})+0.25\{(f(n_{min}+1)-f(n_{min}))-(f(n_{min}-2)-f(n_{min}-1))\}]x+f(n_{min}) \quad (21)$$

whereas the expression of line L6 is represented by $$y=-[f(n_{min}+1)-f(n_{min})+0.25\{(f(n_{min}+1)-f(n_{min}))-(f(n_{min}-2)-f(n_{min}-1))\}]x+f(n_{min}-1)-[f(n_{min}+1)-f(n_{min})+0.25\{(f(n_{min}+1)-f(n_{min}))-(f(n_{min}-2)-f(n_{min}-1))\}] \quad (22)$$

Therefore, the interpolation amount $\Delta f$ can be determined by calculating $f(n_{min})$ by erasing x from the above-mentioned interpolation expressions (21) and (22).

If expression (19) is not satisfied, on the other hand, the interpolation amount $\Delta f$ is computed according to. the following expression:

$$\Delta f=(f(n_{min}+1)-f(n_{min}-1))/2 \quad (23)$$

Figure 21:
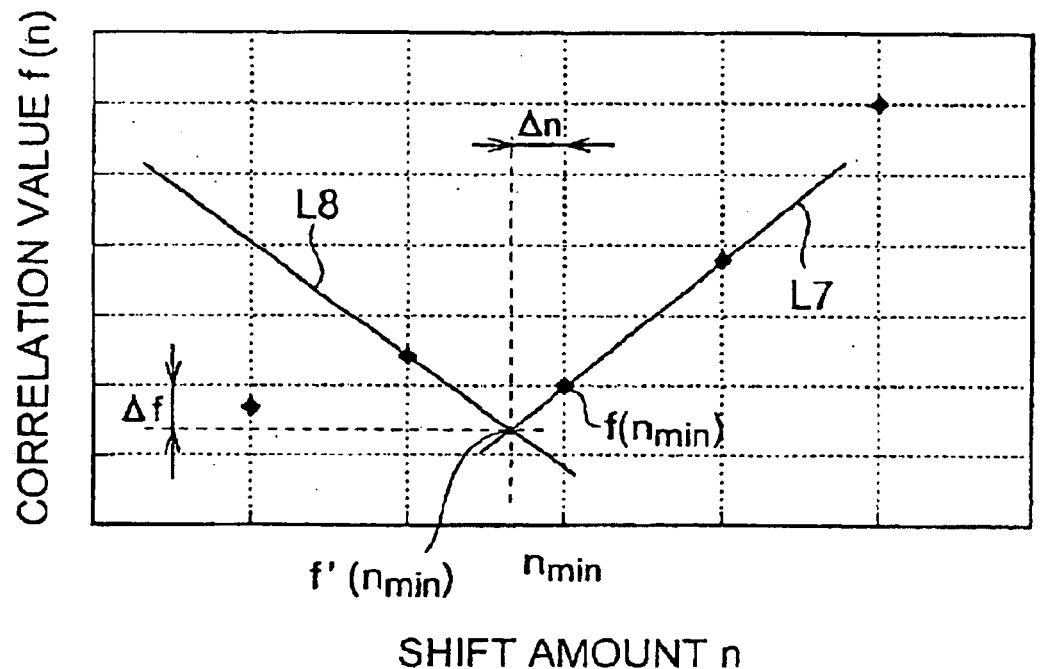
FIG. 21 is a fourth chart for explaining a process of interpolating correlation local minimum values.

When an intersection between a line L7 passing a point of the correlation local minimum value $f(_{min})$ of shift amount $n_{min}$ and a point of the correlation value $f(n_{min}+1)$ of shift amount $n_{min}+1$, and a line L8 passing a point of the correlation value $f(n_{min}-1)$ of the shift amount $n_{min}-1$ while having a gradient with the same absolute value as that of the line L7 and the opposite polarity is determined as shown in FIG. 21, the interpolation amount $\Delta f$ indicates the difference between the correlation value at this intersection and the smallest correlation local minimum value $f(n_{min})$.

As shown in FIG. 21, this arithmetic expression (23) is derived from expressions of the lines L7 and L8 as the above-mentioned interpolation expressions. The expression of line L7 is represented by $$y=[f(_{min}+1)-f(n_{min})]x+f(n_{min}), \quad (24)$$

whereas the expression of line L8 is represented by $$y=-[f(n_{min}+1)-f(n_{min})]x+f(n_{min}-1)-(f(_{min}+1)-f(n_{min})). \quad (25)$$

Therefore, the interpolation amount $\Delta f$ can be determined by calculating $f(n_{min})$ by erasing x from the above-mentioned interpolation expressions (24) and (25).

Using thus computed interpolation amount $\Delta f$, the correlation local minimum value $f(n_{min})$ is interpolated, so as to compute a plurality of interpolated correlation local minimum values $f'(n_{min})$ (step S1610).

Subsequently, the validity of thus obtained plurality of interpolated correlation local minimum values is determined (step S1612). Specifically, using the interpolation amount $\Delta f$, it is determined whether the interpolated correlation local minimum value $f'(n_{min})$ is valid or not according to expression (26):

interpolated amount $\Delta f$>reference value $R3$. (26)

Figure 22:
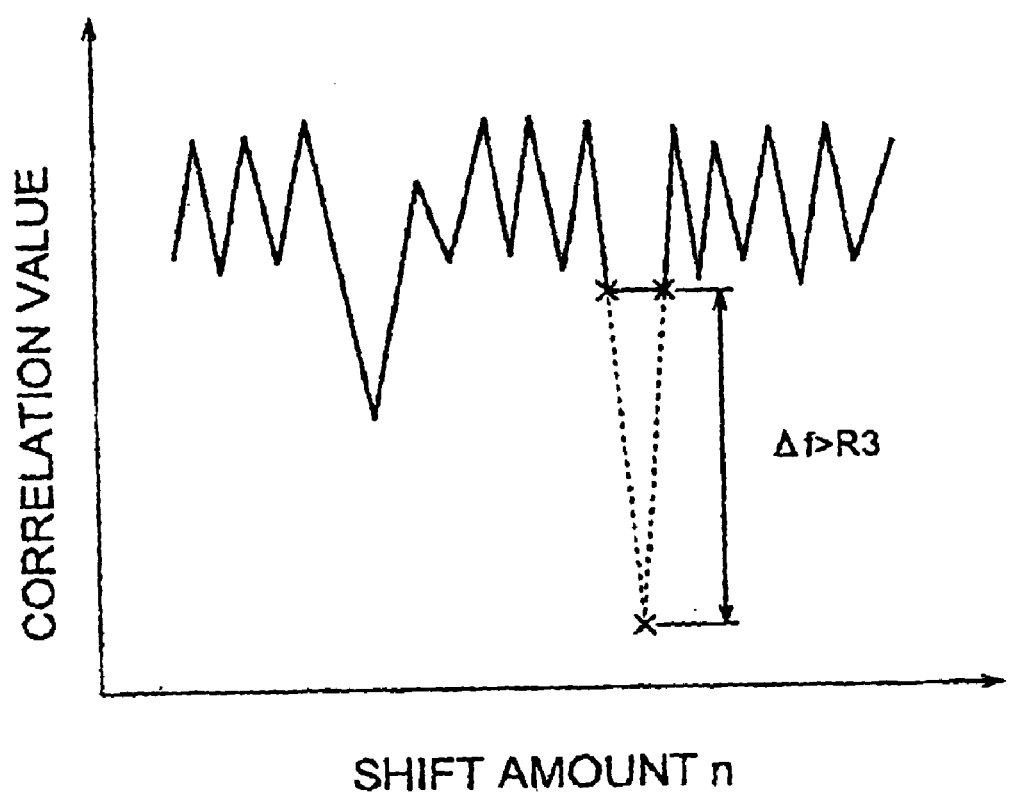
FIG. 22 is a chart for explaining a process of determining whether an interpolated correlation local minimum value is valid or not.

Since the interpolated correlation local minimum value $f'(n_{min})$ obtained by interpolating the correlation local minimum value f($n_{min}$) according to the interpolation amount of greater than the reference value R3 has a low reliability as shown in FIG. 22, the above-mentioned determination is carried out so as to keep such an interpolated correlation local minimum value f'($n_{min}$) from being used, thereby preventing erroneous rangefinding from occurring. The above-mentioned reference value R3 can be set to a desirable value.

If expression (26) is satisfied, it is determined invalid, so that the interpolated correlation local minimum value f'($n_{min}$) is kept from being used, and the flow proceeds to step S1604 in FIG. 15, which utilizes a plurality of correlation local minimum values f($n_{min}$) before interpolation and chooses the smallest correlation local minimum value $f_{min1}$($n_{min}$) as the highest correlation value.

If expression (26) is not satisfied, by contrast, it is determined valid, whereby a plurality of interpolated correlation local minimum values f'($n_{min}$) having been interpolated are utilized, and the smallest interpolated correlation local minimum value f'$_{min1}$($n_{min}$) is chosen as the highest correlation value (step S1614).

Subsequently, thus chosen smallest interpolated correlation local minimum value f'$_{min1}$($n_{min}$) and are reference value R4 are compared with each other (step S1616). If the smallest interpolated correlation local minimum value f'($_{min}$ ($n_{min}$) is at the reference value R4 or greater, it is determined that the correlation is low, whereby the rangefinding is considered to be erroneous (rangefinding is disabled) (step S1618).

If the smallest interpolated correlation local minimum value f'$_{min1}$($n_{min}$) is smaller than the reference value R4, the flow proceeds to step S1620, at which the smallest interpolated correlation local minimum value f'$_{min1}$($n_{min}$) is compared with a reference value R5 (<R4). If the smallest interpolated correlation local minimum value f'$_{min1}$($n_{min}$) is smaller than the reference value R5, the flow proceeds to step S1622, at which the difference Df'$_{min}$ between the smallest interpolated correlation local minimum value f'$_{min1}$($n_{min}$) and the second smallest interpolated correlation local minimum value f'$_{min2}$($n_{min}$) is computed, and thus obtained difference Df'$_{min}$ is compared with a predetermined reference value R6. If it is determined that the difference Df'$_{min}$ is greater than the predetermined reference value R6, the smallest interpolated correlation local minimum value f'$_{min1}$ ($n_{min}$) is employed to be used for calculating the object distance (step S1624). If it is determined that the difference Df'$_{min}$ is smaller than the predetermined reference value R6, by contrast, the rangefinding is considered to be in error (step S1618).

If it is determined at step S1620 that the smallest interpolated correlation local minimum value f'$_{min1}$($n_{min}$) is greater than the reference value R5, the flow proceeds to step S1626, at which the difference Df'$_{min}$ between the smallest interpolated correlation local minimum value f'$_{min1}$($n_{min}$) and the second smallest interpolated correlation local minimum value f'$_{min2}$($n_{min}$) is computed, and thus obtained difference Df'$_{min}$ is compared with a predetermined reference value R7 (>R6). If it is determined that the difference Df'$_{min}$ is greater than the predetermined reference value R7, the smallest interpolated correlation local minimum value f'$_{min1}$($n_{min}$) is employed to be used for calculating the object distance (step S1624). If it is determined that the difference Df'$_{min}$ is smaller than the predetermined reference value R7, by contrast, the rangefinding is considered to be in error (step S1618).

Figure 23:
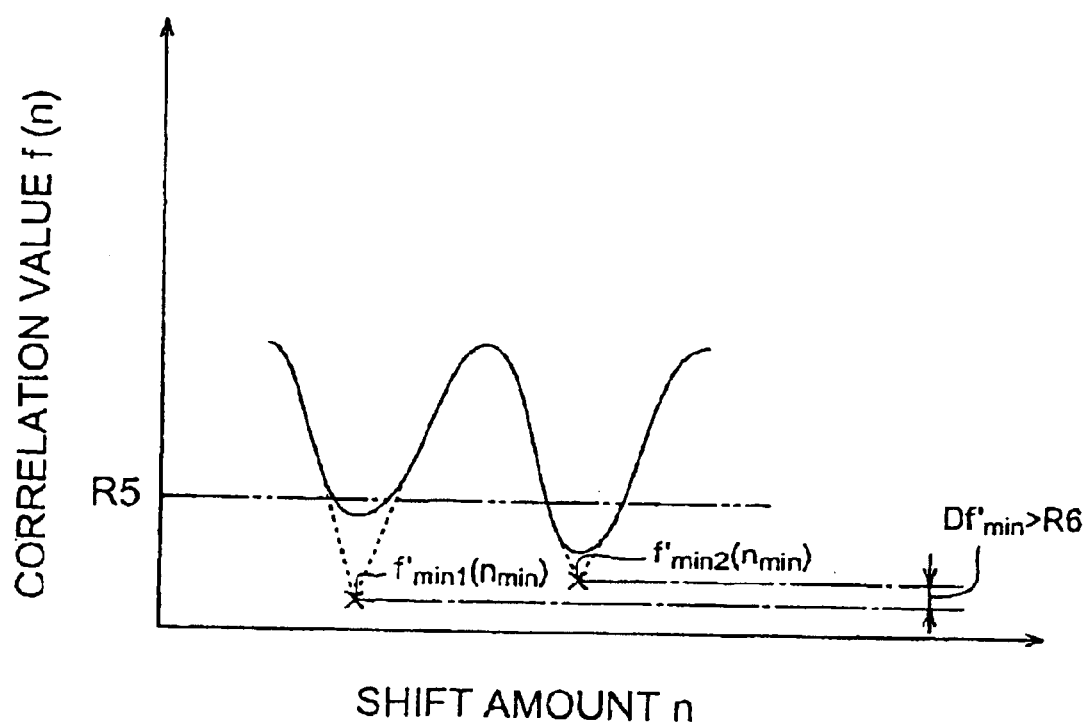
FIG. 23 is a chart for explaining a process of comparing the difference between the smallest interpolated correlation local minimum value and the second smallest interpolated correlation local minimum value with a predetermined reference value.
Figure 24:
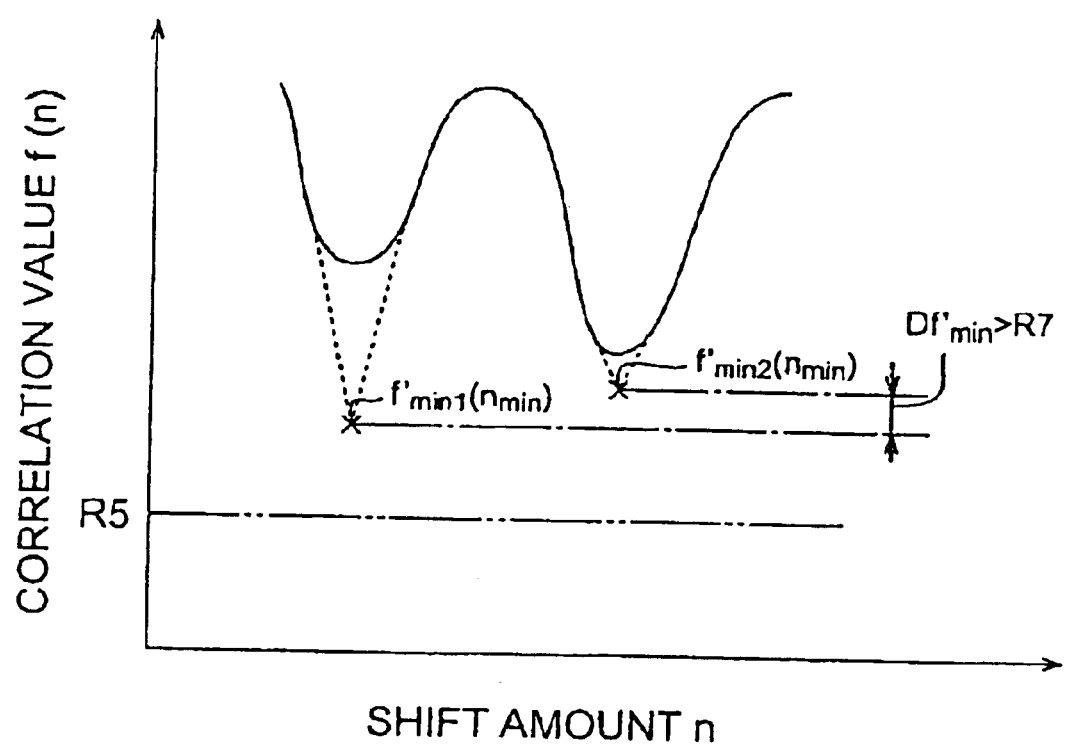
FIG. 24 is a chart for explaining a process of comparing the difference between the smallest interpolated correlation local minimum value and the second smallest interpolated correlation local minimum value with a predetermined reference value.
Figure 26:
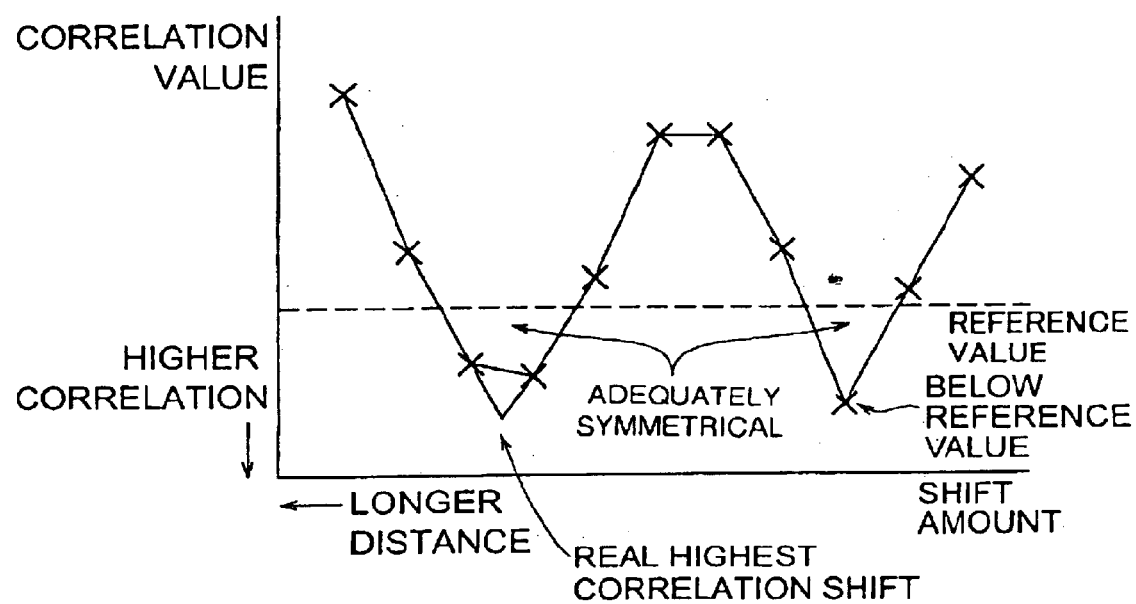
FIG. 26 is a chart for explaining a rangefinding technique in the conventional rangefinder apparatus.

Thus, the smallest interpolated correlation local minimum value f'$_{min1}$($n_{min}$) and the predetermined reference value R5 are compared with each other at step S1620, and reference values for determining whether the difference Df'$_{min}$ is greater or smaller are switched between steps S1622 and S1626 according to the magnitude of smallest interpolated correlation local minimum value f'$_{min1}$($n_{min}$). More specifically, when the smallest interpolated correlation local minimum value f'$_{min1}$($n_{min}$) is smaller than the reference value R5, R6 smaller than R7 is employed at step S1622 as the reference value for determining whether the difference Df'$_{min}$ is greater or smaller as shown in FIG. 23. When the smallest interpolated correlation local minimum value f'$_{min1}$ ($n_{min}$) is greater than the reference value R5, R7 greater than R6 is employed at step S1626 as the reference value for determining whether the difference Df'$_{min}$ is greater or smaller as shown in FIG. 24. Thus switching reference values for determining whether the difference Df'$_{min}$ is greater or smaller according, to the magnitude of the smallest interpolated correlation local minimum value f'$_{min1}$($n_{min}$) enables further detail examination of the reliability of the selected highest correlation value. Here, the above-mentioned reference values R4, R5, R6, and R7 can be set to desirable values.

Figure 14:
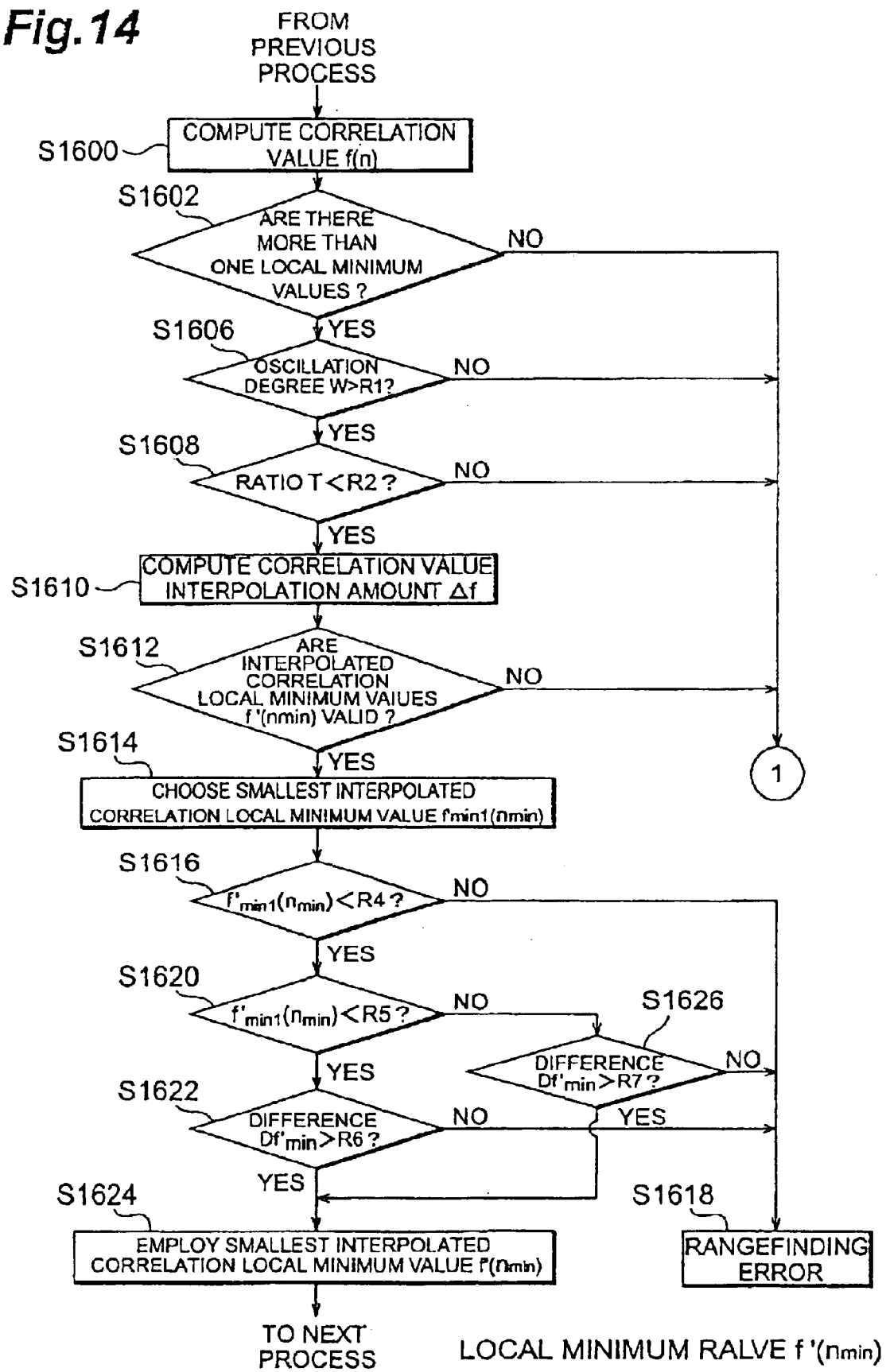
FIG. 14 is a first flowchart for explaining a procedure of correlation value computing.

The subsequent process after the smallest correlation local minimum value f$_{min1}$($n_{min}$) is chosen at step S1604 in FIG. 15 is the same as that after the smallest interpolated correlation local minimum value f'$_{min1}$($n_{min}$) is chosen at step S1614 in FIG. 14.

First, thus chosen smallest correlation local minimum value f$_{min1}$($n_{min}$) and a reference value R8 are compared with each other (step S1628) If the smallest correlation local minimum value f$_{min1}$($n_{min}$) is not smaller than the reference value R8, it is determined that the correlation is low, whereby the rangefinding is considered to be in error (rangefinding is disabled) (step S1630).

If the smallest correlation local minimum value f$_{min1}$ ($n_{min}$) is smaller than the reference value R8, by contrast, the flow proceeds to step S1632, at which the smallest correlation local minimum value f$_{min1}$($n_{min}$) and a reference value R9 (<R8) are compared with each other. If the smallest correlation local minimum value f$_{min1}$($n_{min}$) is smaller than the reference value R9, the flow proceeds to step S1634, at which the difference Df$_{min}$ between the smallest correlation local minimum value f$_{min1}$($n_{min}$) and the second smallest correlation local minimum value f$_{min2}$($n_{min}$) is computed, and thus obtained difference Df$_{min}$ and a predetermined reference value R10 are compared with each other. If it is determined that the difference Df$_{min}$ is greater than the predetermined reference value R10, the smallest correlation local minimum value f$_{min1}$($n_{min}$) is employed to be used for calculating the object distance (step S1636). If it is determined that the difference Df$_{min}$ is smaller than the predetermined reference value R10, by contrast, the rangefinding is considered to be in error (step S1630).

If it is determined at step S1632 that the smallest correlation local minimum value f$_{min1}$($n_{min}$) is greater than the reference value R9, the flow proceeds to step S1638, at which the difference Df$_{min}$ between the smallest correlation local minimum value f$_{min1}$($n_{min}$) and the second smallest correlation local minimum value f$_{min2}$($n_{min}$) is computed, and thus obtained difference Df$_{min}$ and a predetermined reference value R11 (>R10) are compared with each other. If it is determined that the difference Df$_{min}$ is greater than the predetermined reference value R11, the smallest correlation local minimum value f$_{min1}$($n_{min}$) is employed as the highest correlation value (step S1636). If it is determined that the difference Df$_{min}$ is smaller than the predetermined reference value R11, by contrast, the rangefinding is considered to be in error (step S1630).

Thus, the smallest correlation local minimum value $f_{min1}(n_{min})$ and the predetermined reference value R9 are compared with each other at step S1632, and reference values for determining whether the difference $Df_{min}$ is greater or smaller are switched between steps S1634 and S1638 according to the magnitude of smallest correlation local minimum value $f_{min1}(n_{min})$. More specifically, if the smallest correlation local minimum value $f_{min1}(n_{min})$ is smaller than the reference value R9, R10 smaller than R11 is employed at step S1634 as the reference value for determining whether the difference $Df_{min}$ is greater or smaller. If the smallest correlation local minimum value $f_{min1}(n_{min})$ is greater than the reference value R9, R11 greater than R10 is employed at step S1638 as the reference value for determining whether the difference $Df_{min}$ is greater or smaller. Thus switching reference values for determining whether the difference $Df_{min}$ is greater or smaller according to the magnitude of the smallest interpolated correlation local minimum value $f_{min1}(n_{min})$ enables further detail examination of the reliability of the selected highest correlation value. Here, the above-mentioned reference values R8, R9, R10, and R11 can be set to desirable.

Thus, a correlation value exhibiting the highest correlation is determined with the highest possible accuracy.

Details of computing the shift amount χ (step S20 in FIG. 9) by using thus employed smallest interpolated correlation local minimum value $f'_{min}(n_{min})$ or smallest correlation local minimum value $f_{min}(n_{min})$ will now be explained.

Details of Shift Amount Computing Process (Step S20)

First, if the smallest interpolated correlation local minimum value $f'_{min}(n_{min})$ is employed at step S1636 in FIG. 15, the shift amount at that time is used as it is (shift amount n=shift amount χ).

If the smallest correlation local minimum value $f'_{min}(n_{min})$ is employed at step S1624 in FIG. 14, by contrast, the shift amount χ is computed in the following manner.

First, using the smallest correlation local minimum value $f_{min1}(n_{min})$ and respective correlation values therebefore and thereafter, the shift interpolation amount Δn for interpolating the shift amount n yielding the smallest correlation local minimum value $f_{min1}(n_{min})$ is computed.

This shift interpolation amount Δn is determined according to respective arithmetic expressions corresponding to arithmetic expressions (12), (15), (20), and (23) used for computing the correlation value interpolation amount Δf. Namely, when the interpolation amount Δf for correlation value is computed according to expression (12), the shift interpolation amount Δn is calculated by $$\Delta n = 0.5 - \frac{(f(n_{\min} + 1) - f(n_{\min}))}{2[f(n_{\min} - 1) - f(n_{\min}) + 0.25\{(f(n_{\min} - 1) - f(n_{\min})) - (f(n_{\min} + 2) - f(n_{\min} + 1))\}]}. \quad (27)$$

This arithmetic expression (27) is derived from the same interpolation expression as that deriving arithmetic expression (12). Namely, the shift interpolation amount Δn can be determined by solving the above-mentioned interpolation expressions (13) and (14) for x after eliminating y therefrom.

When the interpolation amount Δf is computed according to expression (15), the shift interpolation amount Δn is calculated by $$\Delta n = 0.5 - \frac{f(n_{\min} + 1) - f(n_{\min})}{2(f(n_{\min} - 1) - f(n_{\min}))}. \quad (28)$$

This arithmetic expression (28) is derived from the same interpolation expression as that deriving arithmetic expression (15). Namely, the shift interpolation amount Δn can be determined by solving the above-mentioned interpolation expressions (16) and (17) for x after eliminating y therefrom.

When the interpolation amount Δf is computed according to expression (20), the shift interpolation amount Δn is determined by $$\Delta n = 0.5 \frac{(f(n_{\min} - 1) - f(n_{\min}))}{2[f(n_{\min} + 1) - f(n_{\min}) + 0.25\{(f(n_{\min} + 1) - f(n_{\min})) - (f(n_{\min} + 2) - f(n_{\min} + 1))\}]}. \quad (29)$$

This arithmetic expression (29) is derived from the same interpolation expression as that deriving arithmetic expression (23). Namely, the shift interpolation amount Δn can be determined by solving the above-mentioned interpolation expressions (21) and (22) for x after eliminating y therefrom.

When the interpolation amount Δf is computed according to expression (23), the shift interpolation amount Δn is calculated by $$\Delta n = 0.5 - \frac{f(n_{\min} - 1) - f(n_{\min})}{2(f(n_{\min} + 1) - f(n_{\min}))}. \quad (30)$$

This arithmetic expression (30) is derived from the same interpolation expression as that deriving arithmetic expression (23). Namely, the shift interpolation amount Δn can be determined by solving the above-mentioned interpolation expressions (24) and (25) for x after eliminating y therefrom.

Then, the shift amount $n_{min}$ yielding the smallest correlation local minimum value $f_{min1}(n_{min})$ is interpolated by the shift interpolation amount Δn, whereby the shift amount χ to be used for calculating the distance to the object.

As explained in detail in the foregoing, the rangefinder apparatus in accordance with this embodiment detects a plurality of correlation local minimum values $f(n_{min})$, and interpolates them, so as to compute a plurality of interpolated correlation local minimum values $f'(n_{min})$. A plurality of interpolated correlation local minimum values $f'(n_{min})$ obtained by interpolating a plurality of correlation local minimum values $f(n_{min})$ as such have a higher reliability as local minimum values than that of the correlation local minimum values $f(n_{min})$ before interpolation. Among thus computed plurality of interpolated correlation local minimum values $f'(n_{min})$, the first interpolated correlation extreme value $f'_{min1}(n_{min})$ is detected as the highest correlation value, and the shift amount χ is computed according to this value. Therefore, as compared with a case where the highest correlation value is detected from correlation extreme values $f(n_{min})$ before interpolation as conventionally done, the fear of employing correlation values which should not be used is reduced, so that erroneous rangefinding is suppressed.

In any of the cases where a plurality of extreme values do not exist, where the oscillation degree W of AF data is smaller than a predetermined reference value R1, and where the ratio T of the second smallest correlation local minimum value $f_{min2}(n_{min})$ to the smallest correlation local minimum value $f_{min1}(n_{min})$ is greater than a predetermined reference value R2 in the rangefinder apparatus in accordance with this embodiment, the flow proceeds to step S1604 in FIG. 15, at which a plurality of correlation extreme values $f(n_{min})$ before interpolation are utilized, and the smallest correlation local minimum value $f_{min1}(n_{min})$ exhibiting the highest correlation is chosen therefrom. As a consequence, an interpolation process which accompanies numerous arithmetic operations can be omitted in the cases mentioned above, whereby the rangefinding time can be restrained from increasing.

In the case where it is determined that computed interpolated correlation local minimum values f'($n_{min}$) are invalid in the rangefinder apparatus in accordance with this embodiment, the flow also proceeds to step S1604 in FIG. 15, at which a plurality of correlation extreme values f($n_{min}$) before interpolation are utilized, and the smallest correlation local minimum value $f_{min1}(n_{min})$ exhibiting the highest correlation is chosen therefrom. Thus keeping abnormal interpolated correlation local minimum values f'($n_{min}$) from being used can prevent erroneous rangefinding from occurring.

At step S1622 or S1626 in the rangefinder apparatus in accordance with this embodiment, the difference $Df'_{min}$ between the smallest interpolated correlation local minimum value $f'_{min1}(n_{min})$ and the second smallest interpolated correlation local minimum value $f'_{min2}(n_{min})$ is computed, and thus obtained difference $Df'_{min}$ and a predetermined reference value R6 or R7 are compared with each other. If it is determined that the difference $Df'_{min}$ is greater than the predetermined reference value R6 or R7, the smallest interpolated correlation local minimum value $f'_{min}(n_{min})$ is employed to be used for calculating the distance to the object (step S1624). If it is determined that the difference $Df'_{min}$ is smaller than the predetermined reference value R6 or R7, the rangefinding is considered to be in error (step S1618). Thus, when the difference $Df'_{min}$ between the smallest correlation local minimum value $f'_{min1}(n_{min})$ and the second smallest interpolated correlation extreme value $f'_{min2}(n_{min})$ is smaller than the predetermined reference value R6 or R7, the reliability in determination is so low that it is inappropriate to detect any of them as the highest correlation value. Therefore, disabling the rangefinding in such a case further suppresses erroneous rangefinding.

In particular, the smallest correlation local minimum value $f'_{min1}(n_{min})$ and the predetermined reference value R5 are compared with each other at step S1620, and the reference value for determining whether the difference $f'_{min1}(n_{min})$ is greater or smaller is switched to R6 or R7 at steps S1622 and S1626 according to the magnitude of smallest correlation local minimum value $f'_{min1}(n_{min})$. Changing the reference value for determining whether the difference $f'_{min1}(n_{min})$ is greater or smaller according to the magnitude of smallest correlation local minimum value $f'_{min1}(n_{min})$ as such can reduce the fear of excessively finding rangefinding errors.

In the rangefinder apparatus in accordance with this embodiment, the arithmetic expression for computing the shift interpolation amount Δn is derived from the same interpolation expression (gradient) as that for computing the correlation value interpolation amount Δf. Therefore, respective interpolation amounts for computing the shift interpolation amount an and correlation value interpolation amount Δf can be determined according to the same intersection. As a result, the accuracy in distance calculated according to these interpolation amounts improves. Also, when the interpolation amount Δn and correlation value interpolation amount Δf are computed by using arithmetic expressions derived from the same interpolation expression, respective data used for computing the interpolation amount Δn and correlation value interpolation amount Δf overlap each other at least partly, whereby RAM values can be shared, which makes it possible to reduce RAM and shorten the RAM setting time.

Without being restricted to the above-mentioned embodiment, the present invention can be modified in various manners.

For example, the present invention is not restricted to the embodiment in which the AF sensor 74 outputs sensor data, which are then converted into AF data by the CPU 60, so as to carry out the correlation value computing process. The present invention also encompasses an embodiment in which the AF sensor 74 converts sensor data into AF data and outputs the AF data, so that the CPU 60 carries out the correlation value computing process; and an embodiment in which the AF sensor 74 converts sensor data into AF data, carries out the correlation value computing process, and then outputs a distance signal to the CPU 60.

Though 2 interpolated correlation local minimum values are calculated in the above-mentioned embodiment, the number of interpolated correlation local minimum values may be 3 or greater.

The rangefinder apparatus in accordance with the above-mentioned embodiment is applicable not only to cameras but also to other uses.

What is claimed is:

1. A rangefinder apparatus comprising:

autofocus (AF) data generating means for forming an image of light from an object at a distance to be determined by rangefinding onto a pair of line sensors, each line sensor including a plurality of light detecting elements, and generating AF data for computing a correlation value according to signals produced by the light-detecting elements;

AF data acquiring means for acquiring the AF data from a pair of sensor areas used for the rangefinding and respectively within the pair of line sensors;

correlation value computing means for determining a pair of window areas for selecting the AF data to be used for computing the correlation value within the pair of sensor areas, and successively computing correlation values while shifting the pair of window areas;

interpolated correlation extreme value computing means for detecting correlation extreme values, among the correlation values computed by the correlation value computing means, and interpolating the correlation extreme values to compute interpolated correlation extreme values;

highest correlation value detecting means for detecting as a highest correlation value the interpolated correlation extreme value exhibiting the highest correlation, among the interpolated correlation extreme values;

shift amount computing means for computing a shift amount of the window areas yielding the highest correlation value; and object distance calculating means for calculating the distance to the object according to the shift amount computed by the shift amount computing means.

2. The rangefinder apparatus according to claim 1, further comprising oscillation degree calculating means for calculating a value indicative of an oscillation degree of the AF data, wherein the interpolated correlation extreme value computing means computes the interpolated correlation extreme values if the value indicative of the oscillation degree calculated by the oscillation degree calculating means is greater than a predetermined reference value, and the highest correlation value detecting means detects the highest correlation value from the correlation extreme values not interpolated, if the value indicative of the oscillation degree calculated by the oscillation degree calculating means is no larger than the predetermined reference value.

3. The rangefinder apparatus according to claim 1, further comprising comparing means for detecting a first correlation extreme value exhibiting the highest correlation and a second correlation extreme value exhibiting the second highest correlation in the correlation extreme values that are not interpolated, and determining whether difference between the first correlation extreme value and the second correlation extreme value, normalized by the first correlation extreme value, is adequately large by comparing a ratio of the second correlation extreme value to the first correlation extreme value with a predetermined reference value, wherein the interpolated correlation extreme value computing means computes the interpolated correlation extreme values if the comparing means determines that the difference is not adequately large, and the highest correlation value detecting means detects the highest correlation value from the correlation extreme values not interpolated, if the comparing means determines that the difference is adequately large.

4. The rangefinder apparatus according to claim 1, further comprising first determining means for determining validity of the interpolated correlation extreme values computed by the interpolated correlation extreme value computing means, wherein the highest correlation value detecting means detects the highest correlation value from the correlation extreme values not interpolated, if the first determining means determines that the interpolated correlation extreme values are invalid.

5. The rangefinder apparatus according to claim 1, further comprising second determining means for determining ability to calculate the distance to the object by comparing difference between a first interpolated correlation extreme value exhibiting the highest correlation and a second interpolated correlation extreme value exhibiting the second highest correlation in the interpolated correlation extreme values computed by the interpolated correlation extreme value computing means, to a predetermined reference value.

6. The rangefinder apparatus according to claim 5, wherein the second determining means changes the predetermined reference value according to the first interpolated correlation extreme value.

7. The rangefinder apparatus according to claim 1, wherein the shift amount of the window areas yielding the highest correlation values based on the interpolated correlation extreme values is computed using an arithmetic expression that is used in computing the interpolated correlation extreme values.

8. A camera comprising the rangefinder apparatus according to claim 1.

* * * * *